United States Patent
Tanaka et al.

(10) Patent No.: US 8,354,916 B2
(45) Date of Patent: Jan. 15, 2013

(54) RADIO INTERROGATOR SYSTEM AND RADIO COMMUNICATION METHOD THEREFOR

(75) Inventors: Yoshinori Tanaka, Kawasaki (JP);
Teruhisa Ninomiya, Kawasaki (JP);
Nobuhisa Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1350 days.

(21) Appl. No.: 11/599,097

(22) Filed: Nov. 14, 2006

(65) Prior Publication Data
US 2007/0057770 A1    Mar. 15, 2007

Related U.S. Application Data

(63) Continuation of application No. PCT/JP2004/010637, filed on Jul. 27, 2004.

(51) Int. Cl.
*H04Q 5/22* (2006.01)
(52) U.S. Cl. ...................................... 340/10.1; 340/10.2
(58) Field of Classification Search ................ 340/10.1, 340/10.2; 370/338
See application file for complete search history.

(56) References Cited

U.S. PATENT DOCUMENTS

| | | | |
|---|---|---|---|
| 5,712,630 A * | 1/1998 | Nanboku et al. | 340/10.3 |
| 5,751,220 A * | 5/1998 | Ghaffari | 340/12.31 |
| 6,081,718 A | 6/2000 | Ando et al. | |
| 2001/0005685 A1 * | 6/2001 | Nishimori et al. | 455/562 |
| 2006/0049249 A1 * | 3/2006 | Sullivan | 235/385 |

FOREIGN PATENT DOCUMENTS

| | | |
|---|---|---|
| EP | 0585718 | 3/1994 |
| EP | 0899677 | 3/1999 |
| JP | 10-63899 | 3/1998 |
| JP | 2003-150916 | 5/2003 |
| JP | 2003-283367 | 10/2003 |

OTHER PUBLICATIONS

Supplementary European Search Report and Annex to the European Search Report dated Mar. 31, 2009, for corresponding European Application EP 04 77 0948.
International Search Report dated Sep. 21, 2004.

* cited by examiner

*Primary Examiner* — Brian Zimmerman
*Assistant Examiner* — Omer S Khan
(74) *Attorney, Agent, or Firm* — Katten Muchin Rosenman LLP

(57) ABSTRACT

There is provided a radio interrogator system which reduces the interference with a radio transponder and avoids the decrease in throughput of the entire system in a case in which a plurality of radio interrogators are disposed at positions brought relatively close to each other and are simultaneously placed into operation.
The plurality of radio interrogators are classified into two groups and each of the radio interrogators has an operation mode setting unit capable of exclusively setting, for each of the classified groups, a transmission mode for transmitting a radio transmission signal to a radio transponder or a reception mode for receiving a radio response signal transmitted from the radio transponder as a response to a radio transmission signal from the radio interrogator.

15 Claims, 14 Drawing Sheets

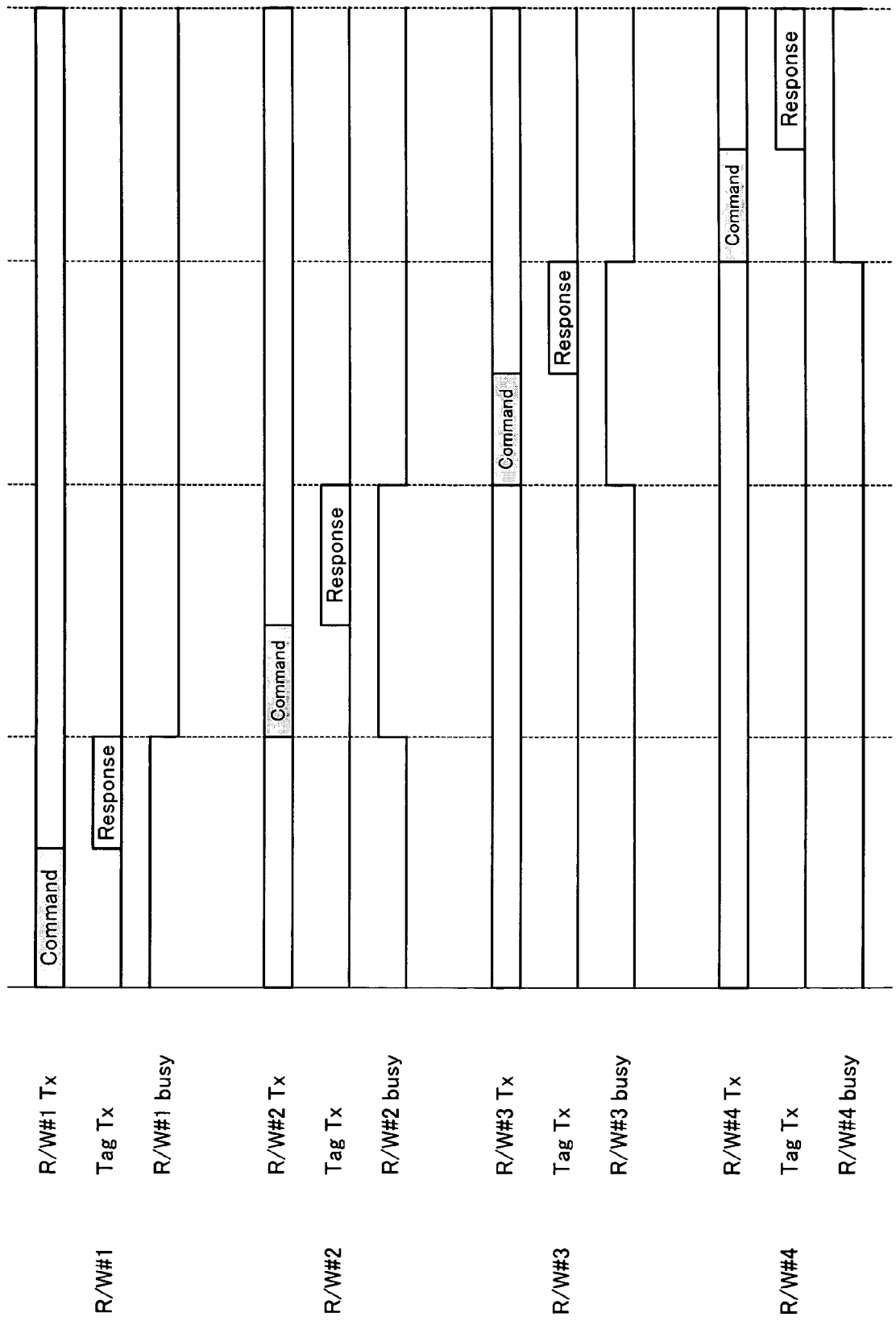

RADIO INTERROGATOR SYSTEM AND RADIO COMMUNICATION METHOD THEREFOR

CROSS-REFERENCE TO RELATED APPLICATION

This application is a continuation of International Application PCT/JP2004/010637, filed on Jul. 27, 2004, now PCT Publication WO 2006/011194, the contents of which are herein wholly incorporated by reference.

TECHNICAL FIELD

The present invention relates to a radio interrogator system including a plurality of radio interrogators and capable of interchanging a radio signal with respect to a radio transponder to write or read out information in or from a storage unit provided in the radio transponder and a radio communication method therefor, for example, a radio interrogator system including a plurality of radio interrogators each having a reader/writer function and capable of interchanging a radio signal with respect to a radio tag serving as a radio transponder to write or read out information in or from a storage unit of the radio tag and a radio communication method therefor.

BACKGROUND ART

A radio tag serving as a radio transponder is a device made to transmit an electric wave having a modulated unique identification information, information stored in a storage unit or the like in response to a reception of an electric wave in a specified frequency band (for example, 13.56 MHz or 2.45 GHz). Radio tags are classified into an active type and a passive type. An active type radio tag can prepare power for itself to simplify a configuration of a reader/writer side apparatus serving as a radio interrogator. The latter cannot prepare power for itself, and conducts operations such as transmission of information by receiving energy from the external. The passive type is preferable from the viewpoint of reduction of cost of a radio tag and particularly has a bright future. When a radio signal in the above-mentioned specified frequency band is transmitted from the reader/writer, the passive type radio tag transmits an electric wave as a response by receiving the supply of power through the electromagnetic coupling by this radio signal.

Thus, the radio tag recognition on the reader/writer side, the readout of information stored in the radio tag and the writing of data in the radio tag can be made through the transmission/reception of data between the reader/writer and the radio tag. Incidentally, the radio tag is equally referred to as an IC (Integrated Circuit) tag, IC card, radio IC tag, electronic tag, transponder, RF (Radio Frequency) tag or RFID (Radio Frequency Identification).

Such a radio tag has already been applied to various fields including manufacturing industry, commercial distribution, transportation and medical treatment. For example, it is attached to various types of parts at a manufacturing stage moving on a line in a product manufacturing process in a factory so as to store a process history and others of each of the parts flowing on the line, thereby achieving efficient product manufacture management.

For the employment of a radio tag as mentioned above, depending upon utilization mode, there is a case in which, particularly, a plurality of readers/writers are disposed to be brought relatively close in distance to each other. For example, with respect to a reader/writer for reading a radio tag attached to a part moving on a manufacturing line as mentioned above, in the case of employing a factory layout in which they are brought close to each other even in different manufacturing processes, it is considered that the readers/writers provided in the respective processes are disposed at positions brought relatively close to each other.

In a case in which a plurality of readers/writers are disposed to be brought relatively close in distance to each other as mentioned above, it is considered that the electric waves (radio transmission signals) transmitted from the respective readers/writers interfere with each other and, in each reader/writer, due to the interference with a radio transmission signal transmitted from the other readers/writers, this works against the communication between radio tags and shortens the communicable distance.

For avoiding such troubles, considered is a first technique in which, for example, as shown in FIG. 13, the respective readers/writers (R/W) 201 to 204 use different frequency channels (f1 to f4) and transmit radio transmission signals to radio tags 211 to 214 which are objects of communication. That is, when a reception unit of each of the readers/writers 201 to 204 is configured to be capable of selectively receiving only a frequency channel to be used for a radio transmission signal, it is possible to reduce the influence of a transmission signal from a reader/writer adjacent thereto or a signal from a radio tag making a communication with the adjacent reader/writer.

In addition, for avoiding the above-mentioned troubles, there is a second technique in which, for example, as shown in FIG. 14, a plurality of readers/writers R/W#1 to R/W#4 successively make communications with radio tags (Tags) which are communication partners, respectively, in a time division fashion. While one reader/writer (for example, R/W#1) makes communications [transmits a command (Command) to a radio tag and receives a radio response signal (Response) from a radio tag], the other readers/writers (R/W#2 to R/W#4) do not make communications, which enables the readers/writers and the tags to avoid the interference with the other readers/writers.

In this connection as the well-known techniques related to the invention of the present application, there has been known the techniques disclosed in the following patent document 1 (Japanese Patent Laid-Open No. 2003-283367) and patent document 2 (Japanese Patent Laid-Open No. 2003-150916).

The patent document 1 discloses the technique in which a plurality of interrogators operating in synchronism with each other are provided so that the communicable areas of antennas overlap with each other, thereby enlarging the communicable areas of the interrogators without incurring interference, omission of detection and decrease in processing speed.

Moreover, the patent document 2 discloses the technique in which, for preventing the interference between radio tags•readers/writers, a function equivalent to a radio tag is added to the radio tags•readers/writers so that the radio tags•readers/writers themselves can behave as a radio tag with respect to a request from the other radio tags•readers/writers.

From the viewpoint of, in each reader/writer, avoiding the above-mentioned interference by a radio transmission signal transmitted from the other readers/writers, the first and second techniques create the following problems.

That is, in the case of the above-mentioned first technique, a radio tag side reception unit is usually designed so as to be capable of receiving signals in a plurality of channels or in different frequency bands, and when viewed from the radio tag side, a signal from the adjacent reader/writer directly causes an interference. That is, in the case of the simultaneous reception of radio signals from a plurality of readers/writers, an interference occurs with the transmission of a normal response to each reader/writer.

In addition, in the case of the above-mentioned second technique, this reader/writer cannot make a communication while the other reader/writer is in communication, which creates a problem of the reduction of throughput of the entire reader/writer. In this case, as the number of readers/writers disposed in a given area where radio transmission signals can interfere with each other increases, the throughput decreases in inverse proportion thereto.

The above-mentioned technique disclosed in the patent document 1 relates to a technique in which, by using a plurality of interrogators synchronized and antennas provided to make communication areas overlap with each other, a communicable area is enlarged to eliminate the detection omission with respect to a transponder moving on a conveyer. That is, this technique differs from a technique for avoiding the interference between radio transmission signals when a plurality of radio interrogators different from each other are simultaneously placed into operation.

Moreover, also in the technique disclosed in the patent document 2, since this reader/writer cannot make a communication while the other reader/writer is in communication, there is a problem in that the throughput of the entire reader/writer system decreases.

The present invention has been developed in consideration of these problems, and it is an object of the invention to provide a radio interrogator system and radio communication method, capable of, even in a case in which a plurality of radio interrogators are disposed at positions brought relatively close to each other and are simultaneously placed into operation, reducing the interference with a radio transponder and avoiding the decrease in throughput of the entire radio interrogator system.

[Patent Document 1] Japanese Patent Laid-Open No. 2003-283367

[Patent Document 2] Japanese Patent Laid-Open No. 2003-150916

DISCLOSURE OF THE INVENTION

For achieving the above-mentioned purpose, a radio interrogator system according to the present invention, which includes a plurality of radio interrogators each made to transmit a radio transmission signal to a radio transponder and receive a radio response signal from the radio transponder, is characterized in that the plurality of radio interrogators are classified into two groups and each of the radio interrogators has an operation mode setting unit to set a transmission mode for transmitting the radio transmission signal to the radio transponder or a reception mode for receiving the radio response signal transmitted from the radio transponder as a response to the radio transmission signal from the radio interrogator for each of the classified groups.

In addition, a radio interrogator system according to the present invention, which includes a plurality of radio•interrogators each made to transmit a radio transmission signal to a radio transponder and receive a radio response signal from the radio transponder, is characterized in that each of the radio interrogators has an operation mode setting unit made to set one of a first group which transmits the radio transmission signal to the radio transponder, a second group which receives the radio response signal transmitted from the radio transponder as a response to the radio transmission signal from the radio interrogator and a third group which does not carry out both the transmission to the radio transponder and the reception of the radio response signal transmitted from the radio transponder.

In this case, preferably, the operation mode setting unit of each of the radio interrogators sets the reception mode without transmitting the radio transmission signal to the radio transponder while the radio interrogators of the other group are in the transmission mode.

Moreover, the operation mode setting unit of each of the radio interrogators sets the transmission mode without receiving the radio response signal from the radio transponder while the radio interrogators of the other group are in the reception mode.

Still moreover, preferably, the operation mode setting unit of each of the radio interrogators has a switching setting unit to switch and set the operation mode of the radio interrogator, in which this operation mode setting unit resides, to one of the transmission mode and the reception mode on the basis of a transmission state of the radio transmission signal and a reception state of the radio response signal in the other radio interrogators and the radio interrogator in which this operation mode setting unit resides.

In this case, the operation mode setting unit of each of the radio interrogators can include a transmission state monitoring unit for monitoring a transmission state of a radio transmission signal to the radio transponder and a transmission busy state notifying unit for, on the basis of a result of the monitoring in the transmission state monitoring unit, making a notification to the effect of a transmission busy state to the switching setting units of the other radio interrogators during the transmission of the radio transmission signal and canceling the notification on the transmission busy state at the time that the transmission of the radio transmission signal comes to an end.

In addition, the operation mode setting unit of each of the radio interrogators can include a reception state monitoring unit for monitoring a reception state of a radio response signal from the radio transponder stemming from the radio transmission signal from the radio interrogator and a reception busy state notifying unit for, on the basis of a result of the monitoring in the reception state monitoring unit, making a notification to the effect of a reception busy state to the switching setting units of the other radio interrogators during the reception of the radio transmission signal and canceling the notification on the reception busy state at the time that the reception of the radio response signal comes to an end.

Still additionally, the switching setting unit of each of the radio interrogators can include a first transmission/reception busy cancellation judgment unit for, on the basis of notifications from the transmission busy state notifying units and the reception busy state notifying units in the radio interrogator, in which the switching setting unit resides, and in the other radio interrogators, canceling the reception busy states of all the radio interrogators pertaining to the group, to which this radio interrogator pertains, and making a judgment as to whether or not the transmission busy states of all the radio interrogators pertaining to the other group are canceled, and a first operation mode switching unit for, when the first transmission/reception busy cancellation judgment unit judges that the reception busy states and the transmission busy states are canceled, carrying out control to switch the operation mode from the reception mode to the transmission mode.

Yet additionally, preferably, the radio interrogators are connected through a line to each other so as to notify, to the other radio interrogators, the reception busy state to be notified by the reception busy state notifying unit and the transmission busy state to be notified by the transmission busy state notifying unit.

Moreover, preferably, a control unit is provided so as to output a control signal for setting the operation mode in each of the radio interrogators selectively to one of the transmission mode and the reception mode, and the operation mode setting unit of each of the radio interrogators is made to set the transmission mode or the reception mode on the basis of the control signal from the control unit.

In this case, the operation mode setting unit of each of the radio interrogators can include a transmission state monitoring unit for monitoring a transmission state of a radio transmission signal to the radio transponder and a transmission busy state notifying unit for, on the basis of a result of the monitoring in the transmission state monitoring unit, making a notification to the effect of a transmission busy state to the control unit during the transmission of the radio transmission signal and canceling the notification on the transmission busy state at the time that the transmission of the radio transmission signal comes to an end.

Still moreover, preferably, the control unit and the radio interrogators are connected through a line to each other so that the reception busy state notifying unit notifies the reception busy state to the control unit and the transmission busy state notifying unit notifies the transmission busy state to said control unit and the control unit outputs the control signal to each of the radio interrogators.

In the foregoing radio interrogator system, preferably, the plurality of radio interrogators are classified into two groups so that the minimum distance between the individual radio interrogators pertaining to the same group becomes relatively long. In addition, preferably, the plurality of radio interrogators are classified into two groups according to frequency channel.

Furthermore, a radio communication method according to the present invention for a radio interrogator system including a plurality of radio interrogators each made to interchange a radio signal with respect to a radio transponder is characterized in that the plurality of radio interrogators are classified into two groups by two types of communication channels and the radio interrogator pertaining to one group is set in a reception mode for receiving, from the radio transponder, a radio response signal stemming from a radio transmission signal from the radio interrogator pertaining to the one group without transmitting a radio transmission signal to the radio transponder while the radio interrogators pertaining to the other group are in a transmission mode for transmitting a radio transmission signal to the radio transponder, and the radio interrogator pertaining to the one group is set in a transmission mode for transmitting a radio transmission signal to the radio transponder without receiving a radio response signal from the radio transponder while the radio interrogator pertaining to the other group is in a reception mode for receiving, from the radio transponder, a radio response signal stemming from a radio transmission signal from the radio interrogator pertaining to the other group.

In this case, preferably, the plurality of radio interrogators are classified into two groups so that the minimum distance between the individual radio interrogators pertaining to the same group becomes relatively long.

Moreover, in the foregoing radio communication method, preferably, the plurality of radio interrogators are classified into the two groups according to a frequency channel set in each of the radio interrogators for interchanging a radio signal with respect to the radio transponder.

It is also appropriate that, for setting the operation mode, the radio interrogator in the transmission mode monitors a transmission state of the radio transmission signal and outputs a transmission busy state during the transmission of the radio transmission signal and cancels the output of the transmission busy state at the time that the transmission of the radio transmission signal comes to an end while the radio interrogator in the reception mode monitors a reception state of the radio response signal and outputs a reception busy state during the reception of the radio response signal and cancels the output of the reception busy state at the time that the reception of the radio response signal comes to an end.

In addition, it is also acceptable that, for setting the operation mode, each of the radio interrogators in the reception mode makes a judgment, on the basis of the transmission busy states and the reception busy states outputted from this radio interrogator and the other radio interrogators, as to whether or not the reception busy states of all the radio interrogators pertaining to the group including this radio interrogator are canceled and the transmission busy states of all the radio interrogators pertaining to the other group are canceled and, when the judgment shows the cancellation of the reception busy states and the transmission busy states, carries out control for switching the operation mode from the reception mode to the transmission mode while each of the radio interrogators in the transmission mode makes a judgment, on the basis of the transmission busy states and the reception busy states outputted from this radio interrogator and the other radio interrogators, as to whether or not the transmission busy states of all the radio interrogators pertaining to the group including this radio interrogator are canceled and the reception busy states of all the radio interrogators pertaining to the other group are canceled and, when the judgment shows the cancellation of the transmission busy states and the reception busy states, carries out control for switching the operation mode from the transmission mode to the reception mode.

Still additionally, in the foregoing radio communication method, preferably, each of the radio interrogators transmits dummy data from when the transmission of the radio transmission signal to the radio transponder comes to an end until the transmission busy states of all the radio interrogators pertaining to the group including this radio interrogator are canceled and the reception busy states of all the radio interrogators pertaining to the other group are canceled.

As described above, in each radio interrogator, for each group, the operation mode setting unit can set exclusively the transmission mode for transmitting a radio transmission signal to the radio transponder or the reception mode for receiving a radio response signal transmitted from the radio transponder as a response to a radio transmission signal from the radio interrogator and, hence, in a case in which a plurality of radio interrogators are disposed at positions relatively close to each other and simultaneously put into operation, there are advantages in that the interference with the radio interrogators is reducible and the reduction of throughput in the entire radio interrogator system is avoidable.

BRIEF DESCRIPTION OF THE DRAWINGS

FIG. 11 is a block diagram showing a modification of the second embodiment of the present invention.

FIG. 14 is an illustration for explaining a conventional technique.

BEST MODE FOR CARRYING OUT THE INVENTION

Embodiments of the present invention will be described hereinbelow with reference to the drawings.

[a] Description of First Embodiment

Figure 1:
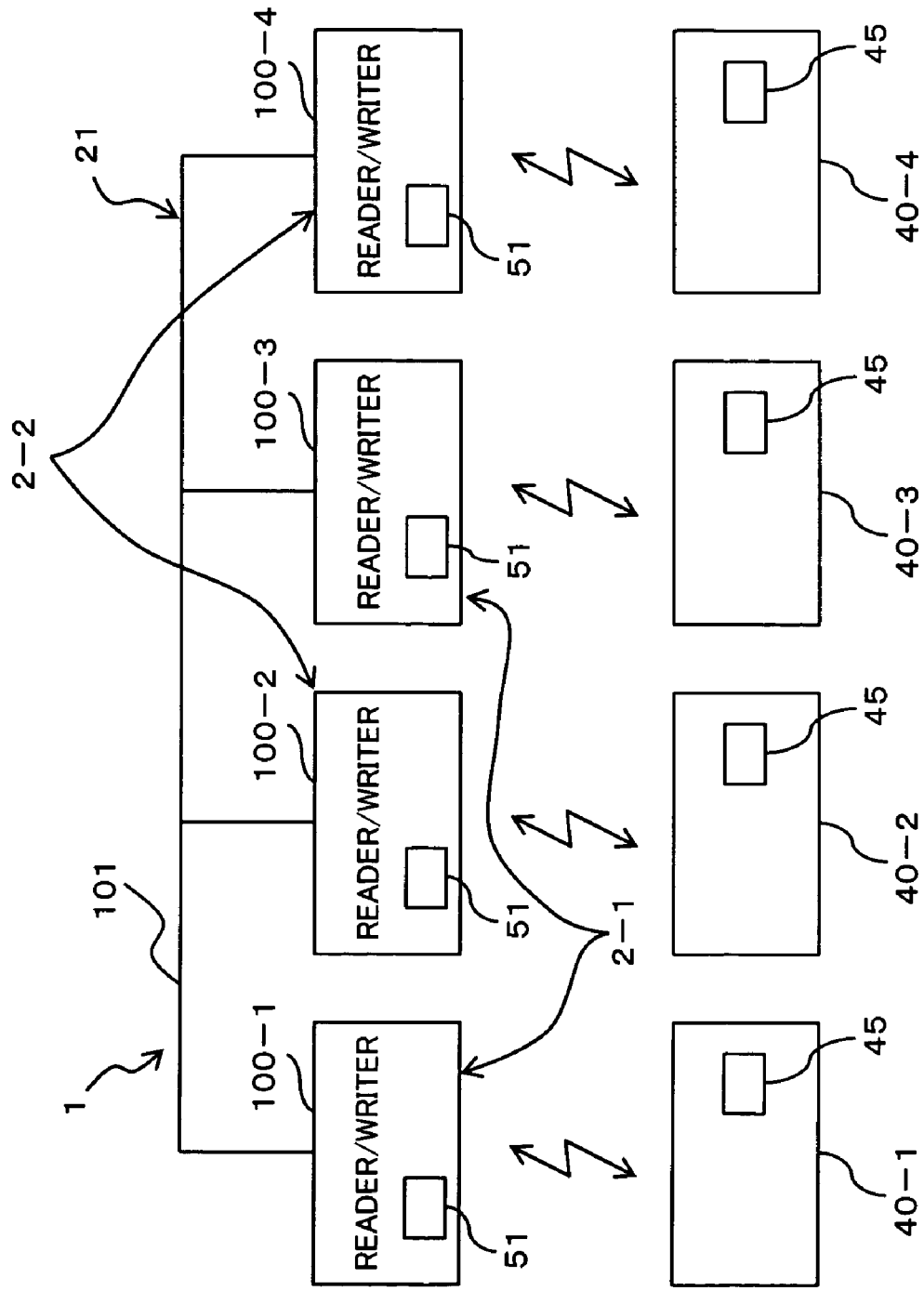
FIG. 1 is a block diagram showing a first embodiment of the present invention.

FIG. 1 is a block diagram showing a first embodiment of the present invention. In FIG. 1, numeral 1 designates a radio interrogator system 1, and this radio interrogator system 1 includes a plurality of (in this case, four) readers/writers 100-1 to 100-4 each serving as a radio interrogator capable of writing or reading out information in or from a storage unit 45, provided in each of radio tags 40-1 to 40-4, through the transmission of radio transmission signals to the radio tags 40-1 to 40-4 each serving as a radio transponder and through the reception of radio response signals from the radio tags 40-1 to 40-4.

Moreover, the readers/writers 100-1 to 100-4 constituting this radio interrogator system 1 are located, for example, on a manufacturing line in a factory to carry out the product manufacture management in a state where the radio tags 40-1 to 40-4 are respectively attached to assembly parts or the like flowing on the line. That is, for example, the manufacture management information such as the present manufacture stage and the schedule of product completion can be written or read out in or from the storage units 45 of the radio tags 40.

Still moreover, in the first embodiment, the readers/writers 100-1 to 100-4 are arranged linearly in the order of the readers/writers 100-1 to 100-4 and disposed to be relatively close to each other, and they are classified into two groups in order to avoid the interference in radio transmission signals to the radio tags 40 between the adjacent readers/writers 100-1 to 100-4. In FIG. 1, the radio tags existing at the positions closest to the respective readers/writers 100-1 to 100-4 are shown as the radio tags 40-1 to 40-4, respectively.

The respective readers/writers 100-1 to 100-4 are classified into two groups so that the minimum distance between individual readers/writers pertaining to the same group becomes relatively long. Concretely, the readers/writers 100-1 and 100-3 are set as a first group 2-1 while the readers/writers 100-2 and 100-4 are set as a second group 2-2. That is, the readers/writers 100-1 and 100-3 (or the readers/writers 100-2 and 100-4) are not disposed to be adjacent to each other, and the minimum distance between the readers/writers pertaining to the same group can be made longer in comparison with the case in which the readers/writers adjacent to each other are set as the same group.

Thus, the distance between the readers/writers 100-1 and 100-3 (100-2 and 100-4) in the same group 2-1 (2-2) can be set at a distance whereby the interference does not occur when the corresponding radio tags 40-1 and 40-3 (40-2 and 40-4) in close ranges receive radio transmission signals.

In addition, it is also possible to employ a configuration using different communication channels (frequency channels) for each of the groups undergoing the classification as mentioned above. That is, for interchanging radio signals with respect to the radio tags 40-1 to 40-4, the frequency channels which can be set with respect to the respective readers/writers 100-1 to 100-4 are properly selected and allocated thereto.

Accordingly, in a case in which different frequency channels f1 to f4 are allocated to the readers/writers 100-1 to 100-4, respectively, the frequency channels f1 and f3 are allocated to the first group 2-1 while the frequency channels f2 and f4 are allocated to the second group 2-2.

In this connection, for the above-mentioned allocation of the frequency channels, although the different frequency channels are allocated to the readers/writers 100-1 to 100-4 in the groups 2-1 and 2-2, the present invention can also employ other frequency allocation patterns. For example, if the distance between the readers/writers in the same group is a distance which does not develop the interference with respect to the same radio tag, it is also acceptable to allocate the same frequency channel to the readers/writers in the same group.

Moreover, the above-mentioned readers/writers 100-1 to 100-4 are made to mutually make communications as to whether in a transmission mode for a radio transmission signal to the radio tag 40 or in a reception mode for a response signal to a radio transmission signal and, hence, the readers/writers 100-1 to 100-4 are connected through, for example, a wire line 101 to each other so as to configure a LAN (Local Area Network) 21.

Still moreover, each of the readers/writers 100-1 to 100-4 has a control unit 51 functioning as an operation mode setting unit, mentioned later, to exclusively switch the operation mode between the transmission mode and the reception mode for each of the group-classified readers/writers 100-1 to 100-4 on the basis of a transmission state or reception state of each of the readers/writers 100-1 to 100-4 obtainable through the wire line 101 owing to the mutual connections mentioned above.

Figure 2A:
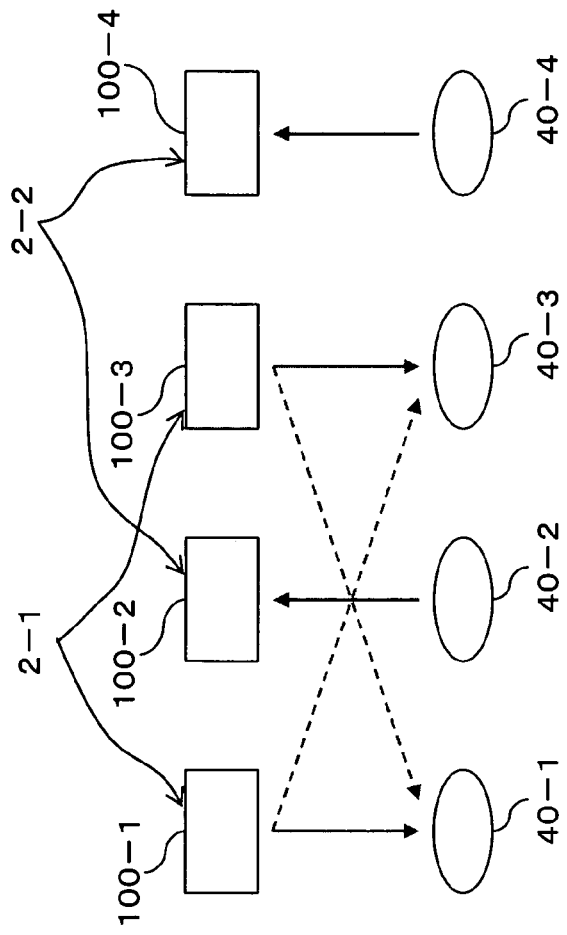
FIGS. 2(A) and 2(B) are illustrations for explaining a characteristic operation of the first embodiment of the present invention.

For example, as shown in FIG. 2(A), each of the readers/writers 100-1 to 100-4 can be made to set an operation mode so that, when the readers/writers 100-1 and 100-3 of the first group 2-1 are in transmission modes for carrying out data transmission (transmission of radio transmission signals) to the radio tags 40-1 and 40-3 closest thereto, respectively, the readers/writers 100-2 and 100-4 of the second group 2-2 come into reception modes for receiving radio response signals (to radio transmission signals transmitted from these readers/writers 100-2 and 100-4) from the radio tags 40-2 and 40-4 closest thereto, respectively.

Figure 2B:
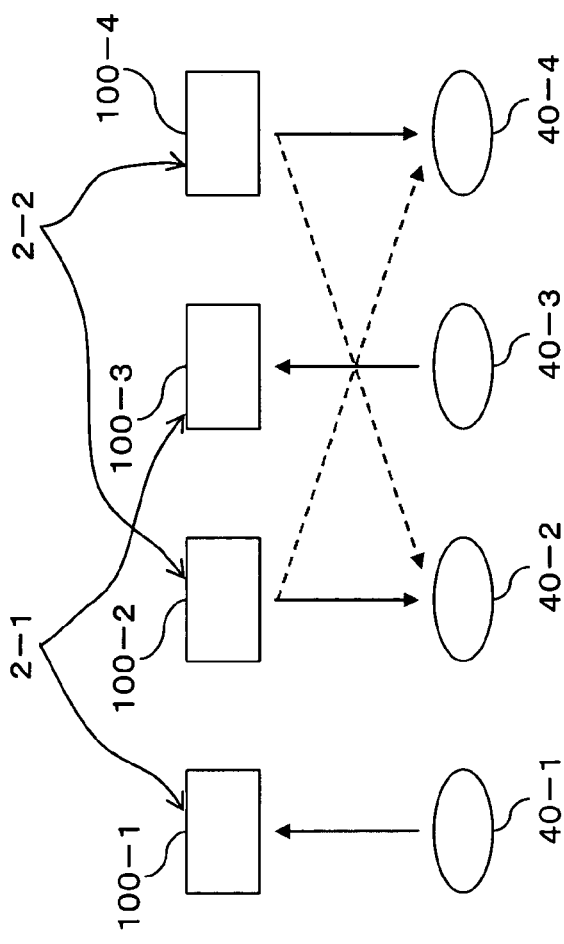

Likewise, as shown in FIG. 2(B), each of the readers/writers 100-1 to 100-4 can be made to set an operation mode so that, when the readers/writers 100-1 and 100-3 of the first group 2-1 are in reception modes for receiving radio response signals (to radio transmission signals transmitted from these readers/writers 100-2 and 100-4) from the radio tags 40-1 and 40-3 closest thereto, respectively, the readers/writers 100-2 and 100-4 of the second group 2-2 come into transmission modes for carrying out data transmission (transmission of radio transmission signals) to the radio tags 40-2 and 40-4 closest thereto, respectively.

Figure 3:
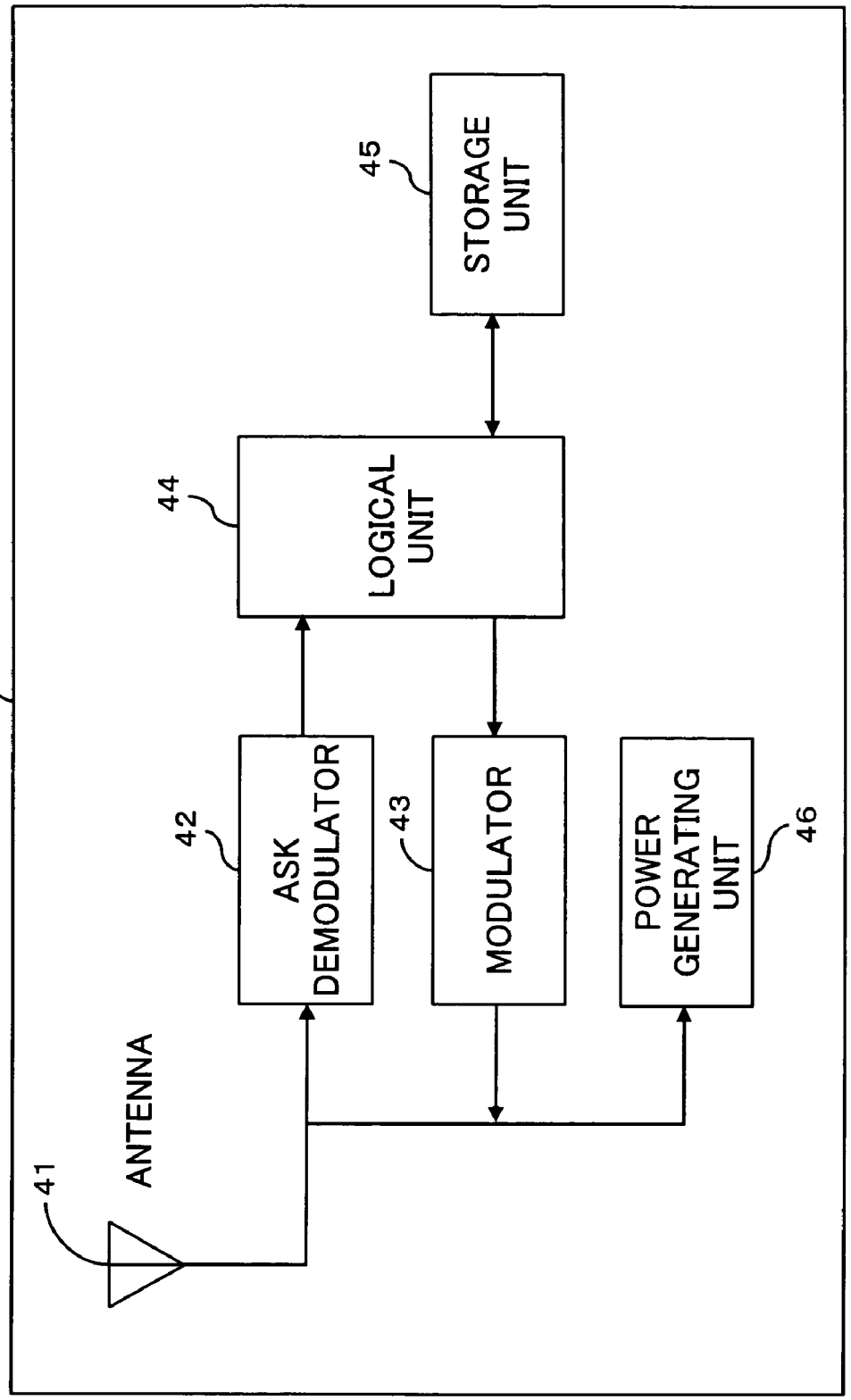
FIG. 3 is a block diagram showing a radio tag in the first embodiment of the present invention.

The radio tags 40-1 to 40-4 have the same configurations and, for example, as shown in FIG. 3, each of the radio tags 40-1 to 40-4 can be configured as a radio tag 40 including an antenna 41, an ASK demodulator 42, a modulator 43, a logical unit 44, a storage unit 45 and a power generating unit 46.

The antenna 41 is for receiving a radio transmission signal from the reader/writer 100-1 to 100-4 and for transmitting a radio response signal to the reader/writer 100-1 to 100-4. The ASK (Amplitude Shift Keying) demodulator 42 is for amplitude-demodulating a radio transmission signal from the reader/writer 100-1 to 100-4 so as to acquire the information amplitude-modulated in the transmitting side reader/writer 100-1 to 100-4.

Moreover, the logical unit 44 is for conducting the data readout or writing processing according to instruction information included in the information from the transmitting side reader/writer 100-1 to 100-4, demodulated by the ASK demodulator 42, and further for generating information as a response to the transmitting side reader/writer 100-1 to 100-4. The storage unit 45 is for storing identification information [ID (Identifier) information] on the radio tags 40 and data such as management information on products to which the radio tags 40 are attached.

That is, the logical unit 44 can be made to, in a case in which readout instruction information is included in the information demodulated by the ASK demodulating unit 42, read out data including the ID information written in the storage unit 45 and made to, if writing instruction information is included together with writing data information, write the writing data information in the storage unit 45.

Still moreover, the modulator 43 is for receiving, from the logical unit 44, an input of the information to be returned as a response to the transmitting side reader/writer 100-1 to 100-4 to modulate the information from the logical unit 44, with the signal modulated being transmitted through the antenna 41 as a radio response signal having a carrier identical in frequency to the radio transmission signal from the reader/writer 100-1 to 100-4. For example, in the logical unit 44, the timing of the transmission of the radio response signal can be controlled by the timing of the output of the information, returned as a response to the transmitting side, to the modulator 43.

Upon receipt of a radio transmission signal from the reader/writer 100-1 to 100-4 through the antenna 41, the power generating unit 46 obtains an electromotive force for the radio tag 40 through an electromagnetic force from this radio transmission signal so as to supply the power to the ASK demodulator 42, the modulator 43, the logical unit 44 and the storage unit 45, each of which is a component.

Figure 4:
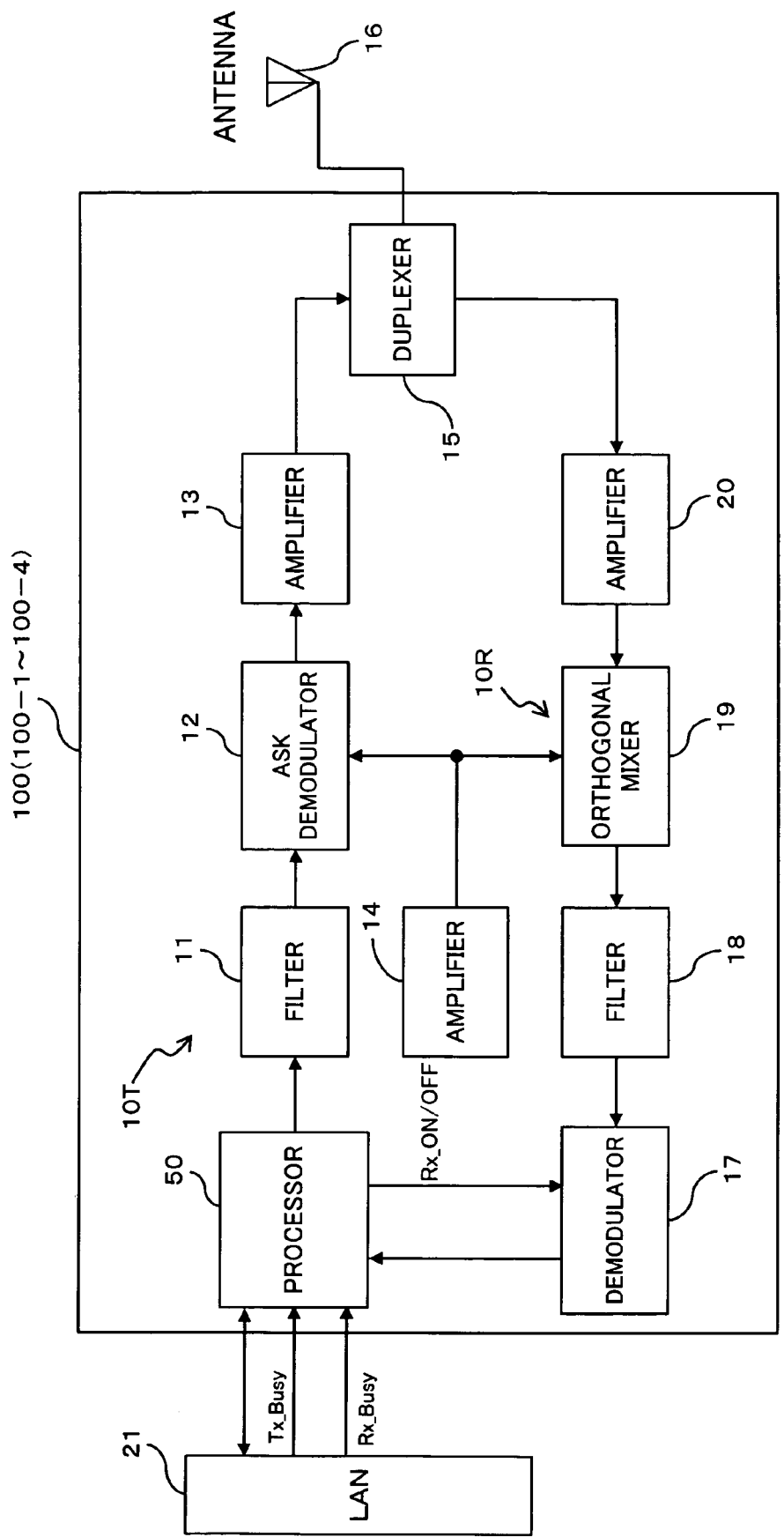
FIG. 4 is a block diagram showing a reader/writer in the first embodiment of the present invention.

Furthermore, the readers/writers 100-1 to 100-4 have the same configurations and, for example, as shown in FIG. 4, each of the readers/writers 100-1 to 100-4 includes a processor 50 having a characteristic configuration according to the invention of the present application and is configured as a reader/writer 100 including a filter 11, an ASK modulator 12, an amplifier 13, an oscillator 14, a duplexer 15, an antenna 16, a demodulator 17, a filter 18, an orthogonal mixer 19 and an amplifier 20.

In this configuration, the processor 50 sets an operation mode of this reader/writer 100 and, when it operates in a transmission mode, generates information (including command information) to be transmitted to the radio tag 40 and, when it operates in a reception mode, analyzes response information from the radio tag 40, inputted through the demodulator 17.

In addition, the filter 11 carries out the filter processing on the transmission information generated by the processor 50, and the ASK modulator 12 carries out the amplitude modulation on the transmission information from the filter 11 by use of a signal generated by the oscillator 14, and this amplitude-modulated signal is amplified by the amplifier 13 and then transmitted as a radio transmission signal through the duplexer 15 and the antenna 16. In other words, the above-mentioned filter 11, ASK modulator 12, amplifier 13, oscillator 13, duplexer 15 and antenna 16 constitute a transmission system 10T for a radio transmission signal.

Still additionally, the amplifier 20 receives a radio response signal from the radio tag 40 (40-1 to 40-4), received through the antenna 16 and inputted through the duplexer 15 so as to amplify the received radio response signal. Yet additionally, the orthogonal mixer 19 mixes a signal from the oscillator 14 with the radio response signal from the amplifier 20 so as to remove the frequency component of the signal from the oscillator 14, included in the radio response signal.

The output signal of the orthogonal mixer 19 is demodulated by the demodulator 17 after the filter processing by the filter 18, and then outputted to the processor 50. That is, it is obtainable by demodulating, by the demodulator 17, the information from the logical unit 44 before modulated by the modulator 43 of the radio tag 40. In other words, the above-mentioned antenna 16, duplexer 15, oscillator 14, amplifier 20, orthogonal mixer 19, filter 18 and demodulator 17 constitute a reception system 10R for a radio response signal from the radio tag 40.

Figure 5:
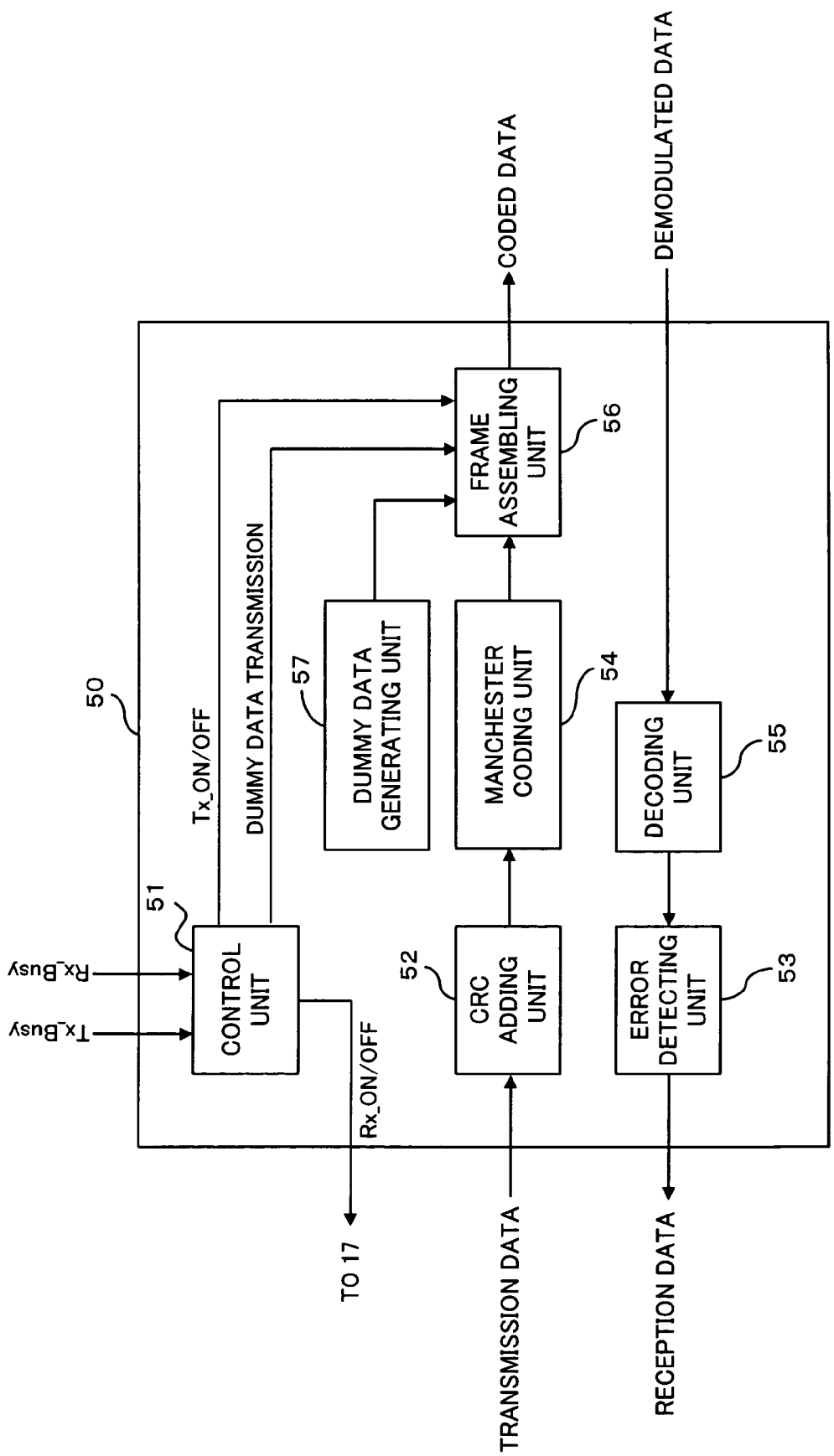
FIG. 5 is a block diagram showing an essential part of a reader/writer in the first embodiment of the present invention.

FIG. 5 is a block diagram showing one example of a configuration of the processor 50 making the aforesaid reader/writer 100 while taking node of a function for signal transmission/reception. As shown in FIG. 5, the processor 50 includes a control unit 51 having a characteristic configuration according to the invention of the present application and a dummy data generating unit 57 for generating dummy data and further includes a CRC adding unit 52, an error detecting unit 53, a Manchester coding unit 54, a decoding unit 55 and a frame assembling unit 56.

That is, the control unit 51 configures an operation mode setting unit capable of exclusively setting a transmission mode for transmitting a radio transmission signal to the radio tag 40-1 to 40-4 or a reception mode for receiving a radio response signal transmitted from the radio tag 40-1 to 40-4 as a response to a radio transmission signal from the reader/writer 100-1 to 100-4, for example, for each of the readers/writers 100-1 to 100-4 group-classified in the radio interrogator system (see FIG. 1).

Moreover, in FIG. 5, the CRC adding unit 52 constituting the processor 50 is for adding an error detection CRC (Cyclic Redundancy Check) code to transmission data to be transmitted as a radio transmission signal from a non-shown data processing function unit in the interior of the processor 50, and the Manchester coding unit 54 is for conducting the Manchester coding processing on the transmission data to which the CRC code by the CRC adding unit 52. The frame assembling unit 56 is for making a transmission frame with respect to the transmission data undergoing the Manchester coding processing by the Manchester coding unit 54, with this transmission frame being outputted as coded data (information to be transmitted) to the filter 11 (see FIG. 4).

The decoding unit 55 is for receiving the response information from the radio tag 40-1 to 40-4, demodulated by the demodulator 17 (see FIG. 4), to decode this response information. That is, by decoding the response information in the decoding unit 55, it is possible to obtain data before the encoding on the response information outputted from the logical unit 44. The error detecting unit 53 is made to carry out an error detection with respect to a radio response signal through the use of the CRC code added to the transmission data in the CRC adding unit 52, with the result thereof being outputted as reception data to the non-shown data processing function unit in the interior of the processor 50.

In addition, the control unit 51 serving as the operation mode setting unit can be made to receive operation mode information from the other readers/writers (for example, in the case of the control unit 51 of the reader/writer 100-1, the readers/writers 100-2 to 100-4) through a LAN 21 to set an operation mode (transmission mode or reception mode) in this reader/writer 100-1, in which it resides, on the basis of the operation mode information from the readers/writers 100-2 to 100-4 and the current setting of the operation mode of this reader/writer 100-1.

The respective readers/writers 100-1 to 100-4 have the same configurations and, taking node of the case of the reader/writer 100-1 classified into the first group 2-1, a concrete description will be given as follows.

That is, the control unit 51 of this reader/writer 100-1 is made to set the operation mode to the reception mode for receiving, from the radio tag 40-1, a radio response signal stemming from a radio transmission signal from this reader/writer 100-1 without transmitting a radio transmission signal to the radio tag 40 (corresponding radio tag 40-1 close thereto) while the readers/writers 100-2 and 100-4 of the second group 2-2 which is the other group are in the transmission modes for transmitting radio transmission signals to the radio tags 40 (corresponding radio tags 40-2 and 40-4) [see FIG. 2(B)].

In addition, the control unit 51 of this reader/writer 100-1 is made to set the operation mode to the transmission mode for transmitting a radio transmission signal to the radio tag 40-1 without receiving a radio response signal from the radio tag 40-1 while the readers/writers 100-2 and 100-4 of the second group 2-2 are in the reception modes for receiving, from the radio tags 40-2 and 40-4, radio response signals resulting from radio transmission signals from these readers/writers 100-2 and 100-4 of the second group [see FIG. 2(A)].

Figure 6:
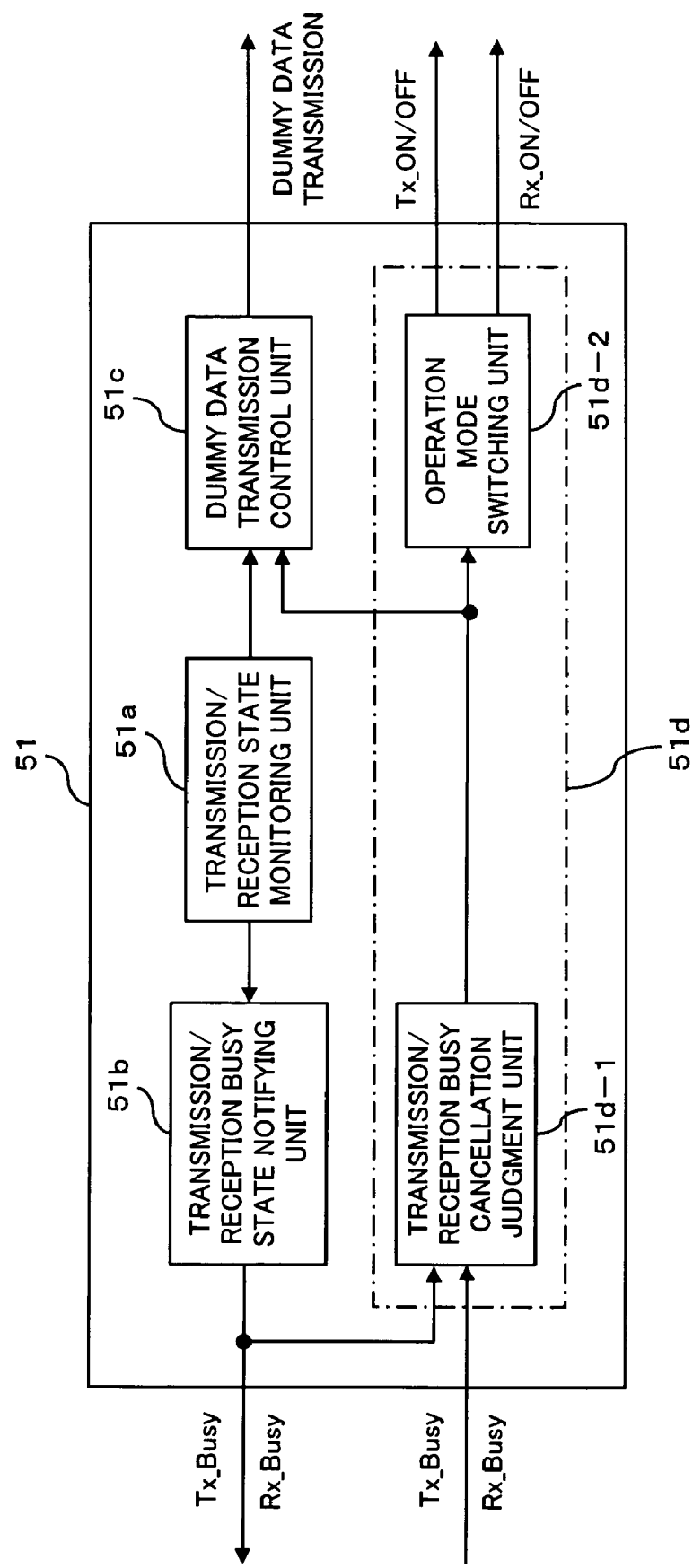
FIG. 6 is a block diagram showing an essential part of a reader/writer in the first embodiment of the present invention.

For this reason, as shown in FIG. 6, the control unit 51 of each of the readers/writers 100-1 to 100-4 includes a transmission/reception state monitoring unit 51a, a transmission/reception state notifying unit 51b and a dummy data transmission control unit 51c and further includes a switching setting unit 51d for making the switching of the operation mode in the reader/writer 100-1 to 100-4, in which it resides, to one of the above-mentioned transmission mode and reception mode and making the setting to it. Although the following description will be given by taking node of the configuration of the control unit 51 of the reader/writer 100-1, the control units 51 of the other readers/writers 100-2 to 100-4 also have the same configurations.

The transmission/reception state monitoring unit (transmission state monitoring unit and reception state monitoring unit) 51a monitors a radio transmission signal (in this reader/writer 100-1) to the radio tag 40-1 and further monitors a reception state of a radio response signal from the radio tag 40-1 which stems from a radio transmission signal from the reader/writer 100-1 in which it resides.

Furthermore, on the basis of a result of monitoring in the transmission/reception state monitoring unit 51a, a transmission/reception busy state notifying unit (transmission busy state notifying unit and reception busy state notifying unit) 51b is made to notify the fact of a transmission busy state (Tx_Busy) to the switching setting units 51d of the other readers/writers 100-2 to 100-4 during the transmission of a radio transmission signal to the radio tag 40-1 and cancel the notification of the transmission busy state (Tx_Busy) at the time of the completion of the transmission of the radio transmission signal to the radio tag 40-1.

Still furthermore, on the basis of a result of monitoring by the transmission/reception state monitoring unit 51a, the transmission/reception busy state notifying unit 51b is made to notify the fact of a reception busy state (Rx_Busy) to the switching setting units 51d of the other readers/writers 100-2 to 100-4 during the reception of a radio response signal from the radio tag 40-1 stemming from a radio transmission signal from this reader/writer 100-1 and cancel the notification of the reception busy state (Rx_Busy) at the time of the completion of the reception of the radio response signal from the radio tag 40-1.

Yet furthermore, the switching setting unit 51d is for switching and setting the operation mode of this reader/writer 100-1 to one of the above-mentioned transmission mode and reception mode on the basis of the transmission states of the radio transmission signals and the reception states of the radio response signals in the other readers/writes 100-2 to 100-4 and this reader/writer 100-1, and, as shown in FIG. 6, it is made up of a transmission/reception busy cancellation judgment unit 51d-1 and an operation mode switching unit 51d-2.

In this configuration, the transmission/reception busy cancellation judgment unit 51d-1 and the operation mode switching unit 51d-2 in the switching setting unit 51d operates in different modes according to whether the reader/writer 100-1 is operating in the reception mode or operating in the transmission mode.

That is, in a case in which the reader/writer 100-1 is operating in the reception mode, on the basis of the notifications (Tx_Busy, Rx_Busy) from the transmission/reception busy state notifying units 51b in this reader/writer 100-1 and the other readers/writers 100-2 to 100-4, the transmission/reception busy cancellation judgment unit 51d-1 makes a judgment as to whether or not the reception busy states of all the readers/writers 100-1 and 100-3 pertaining to the group 2-1, to which the reader/writer 100-1 belongs, are canceled and the transmission busy states of all the readers/writers 100-2 and 100-4 pertaining to the other group 2-2 are canceled, and it is configured as a first transmission/reception busy cancellation judgment unit.

Concretely, in a case in which the judgment shows that not only the cancellation of the reception busy (Rx_Busy) takes place by the transmission/reception busy state notifying unit 51b of this reader/writer 100-1 in which it resides but also the cancellation of the reception busy (Rx_Busy) takes place by the transmission/reception busy state notifying unit 51b of the reader/writer 100-3 pertaining to the same group 2-1 and even the cancellation of the transmission busy (Tx_Busy) takes place by the transmission/reception busy state notifying units 51b of the readers/writers 100-2 and 100-4 pertaining to the other group 2-2, the transmission/reception busy cancellation judgment unit 51d-1 outputs the judgment result to the effect of these cancellations to the operation mode switching unit 51d-2.

In addition, in this case, when the judgment in the transmission/reception busy cancellation judgment unit 51d-1 indicates the cancellations of the reception busy states and the transmission busy state, the operation mode switching unit 51d-2 controls the switching of the operation mode of the reader/writer 100-1 from the reception mode to the transmission mode, and it is configured as a first operation mode switching unit.

At this time, the operation mode switching unit 51d-2 outputs a control signal (Tx_ON) for the transmission mode to the above-mentioned frame assembling unit 56 (see FIG. 5) and, hence, this frame assembling unit 56 can output encoded data as transmission information to the transmission system 10T (see FIG. 4). This enables the encoded data outputted from the frame assembling unit 56 to be transmitted through the transmission system 10T to the radio tag 40-1. In this connection, for the output of the aforesaid Tx_ON to the frame assembling unit 56, a control signal (Rx_OFF) for stopping the operation of the reception system 10R is outputted to the demodulator 17 as needed.

Still additionally, in a case in which the reader/writer 100-1 is operating in the transmission mode, on the basis of the notifications (Tx_Busy, Rx_Busy) from the transmission/reception busy state notifying units 51*b* in this reader/writer 100-1 and the other readers/writers 100-2 to 100-4, the transmission/reception busy cancellation judgment unit 51*d*-1 makes a judgment as to whether or not the cancellation of the transmission busy states of all the readers/writers 100-1 and 100-3 pertaining to the this group 2-1, to which it pertains, takes place and the cancellation of the reception busy states of all the readers/writers 100-2 and 100-4 pertaining to the other group 2-2 takes place, and the transmission/reception busy cancellation judgment unit 51*d*-*l* is configured as a second transmission/reception busy cancellation judgment unit.

Concretely, in a case in which the judgment shows that not only the cancellation of the transmission busy (Tx_Busy) takes place by the transmission/reception busy state notifying unit 51*b* of this reader/writer 100-1 in which it resides but also the cancellation of the transmission busy (Tx_Busy) takes place by the transmission/reception busy state notifying unit 51*b* of the reader/writer 100-3 pertaining to the same group 2-1 and even the cancellation of the reception busy (Rx_Busy) takes place by the transmission/reception busy state notifying units 51*b* of the readers/writers 100-2 and 100-4 pertaining to the other group 2-2, the transmission/reception busy cancellation judgment unit 51*d*-1 outputs the judgment result to the effect of these cancellations to the operation mode switching unit 51*d*-2.

In addition, in this case, when the judgment in the transmission/reception busy cancellation judgment unit 51*d*-1 indicates the cancellations of the transmission busy states and the reception busy state, the operation mode switching unit 51*d*-2 controls the switching of the operation mode from the transmission mode to the reception mode, and it is configured as a second operation mode switching unit.

At this time, the operation mode switching unit 51*d*-2 outputs a control signal (Rx_ON) for the reception mode to the above-mentioned demodulator 17 (see FIG. 4) and, hence, this demodulator 17 can output reception data after the demodulation processing as reception information to the processor 50. That is, the reception system 10R is placed into an operable condition by the control signal (Rx_ON) from the operation mode switching unit 51*d*-2, which enables the reception data after the demodulation processing in the demodulator 17 to be outputted to the decoding unit 55 of the processor 50. In this connection, for the output of the aforesaid Rx_ON to the demodulator 17, a control signal (Tx_OFF) for stopping the operation of the transmission system 10T is outputted to the frame assembling unit 56 (see FIG. 5) as needed.

The dummy data transmission control unit 51*c* constituting the control unit 51 executes the control so that, when this reader/writer 100-1 is operating in the transmission mode, on the basis of a result of the monitoring by the transmission/reception state monitoring unit 51*a* and a result of the judgment by the transmission/reception busy cancellation judgment unit 51*d*-1, dummy data is transmitted from when the transmission of a radio transmission signal to the radio tag 40-1 comes to an end until the transmission busy states of all the readers/writers 100-1 and 100-3 pertaining to this group 2-1 are canceled and the reception busy states of all the readers/writers 100-2 and 100-4 pertaining to the other group are canceled while the transmission of the dummy data is stopped in response to the cancellation of the transmission busy states of all the readers/writers 100-1 and 100-3 pertaining to this group 2-1 and the cancellation of the reception busy states of all the readers/writers 100-2 and 100-4 pertaining to the other group 2-2.

That is, the dummy data transmission control unit 51*c* carries out the control on the basis of a result of the monitoring by the transmission/reception state monitoring unit 51*a* so as to make a radio transmission of dummy data through the transmission system 10T in a case in which, even if the transmission of a radio transmission signal from this reader/writer, in which it resides, to the radio tag 40-1 comes to an end (even if the transmission busy is canceled), the transmission of a radio transmission signal in the reader/writer 100-3 pertaining to the same group 2-1 does not reach completion (no cancellation of the transmission busy) or the reception of a radio response signal in the readers/writers 100-2 and 100-4 pertaining to the other group 2-2 does not reach completion (no cancellation of the reception busy).

At this time, the dummy data transmission control unit 51*c* outputs a control signal (see "dummy data transmission") in FIGS. 5 and 6) to the effect of the transmission of dummy data to the frame assembling unit 56. Upon receipt of this, the frame assembling unit 56 constructs transmission information to be outputted to the transmission system 10T through the use of dummy data produced by the dummy data producing unit 57 without using the data from the Manchester coding unit 54.

Moreover, when receiving the cancellation of the transmission busy states of this reader/writer 100-1 and all the other readers/writers 100-3 pertaining to the group 2-1, to which the reader/writer 100-1 pertains, and the cancellation of the reception busy states of all the readers/writers pertaining to the other group 2-2, the dummy data transmission control unit 51*c* controls the frame assembling unit 56 so as to stop the transmission of the dummy data.

Usually, when the reception of a command through a radio transmission signal comes to an end, the radio tags 40-1 to 40-4 automatically shift to an operation for transmitting a radio response signal as a response to the aforesaid command. In this embodiment, for achieving the synchronization among the operation mode switching timings of the respective readers/writers 100-1 to 100-4, even if the cancellation of the transmission busy takes place in that reader/writer (even when the command transmission reaches completion), the dummy data is still transmitted until the transmission busy and reception busy of all the readers/writers are canceled, thus prolonging the state of the transmission mode.

Figure 7:
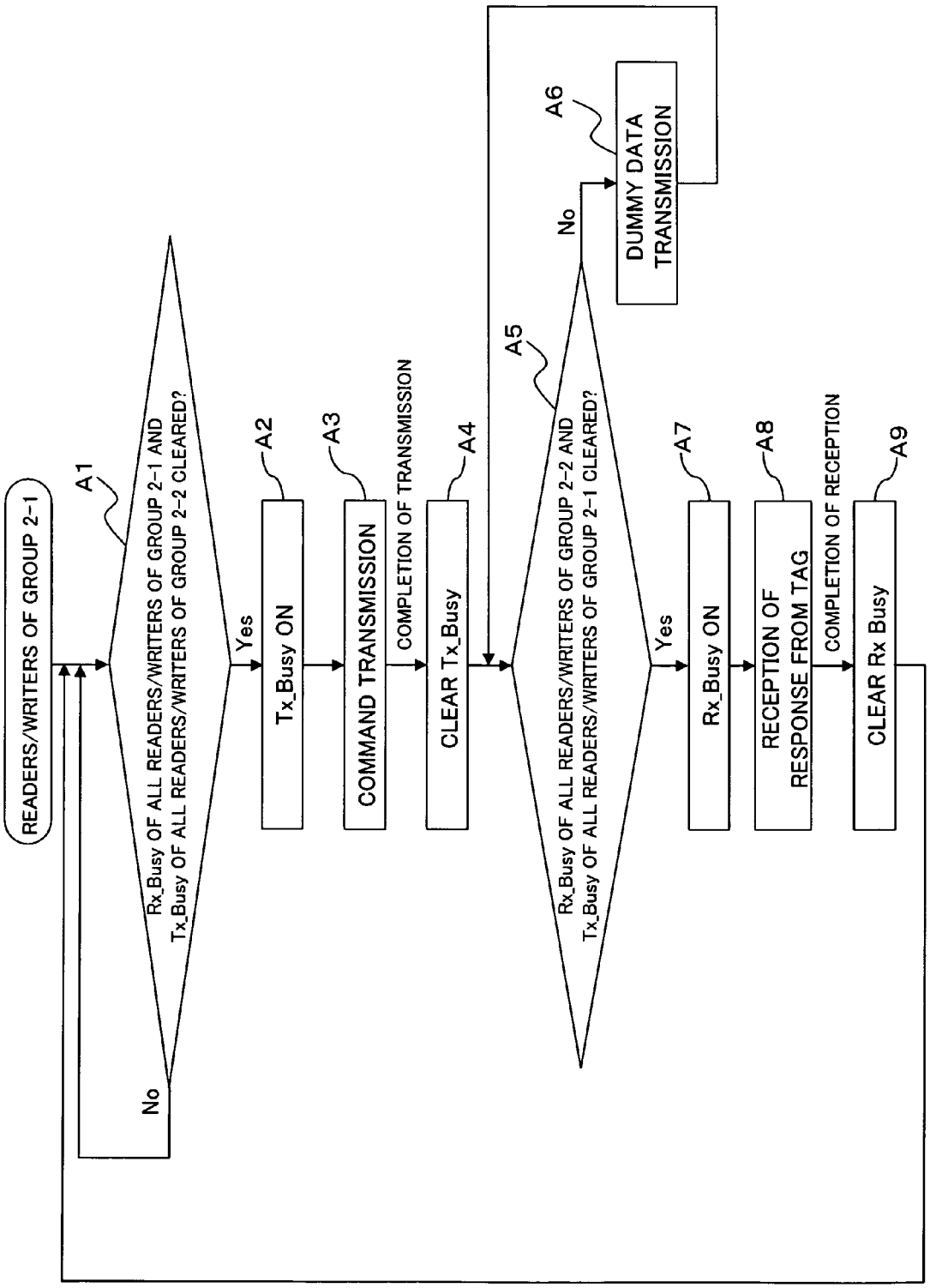
FIG. 7 is a flow chart for explaining an operation of the first embodiment of the present invention.
Figure 8:
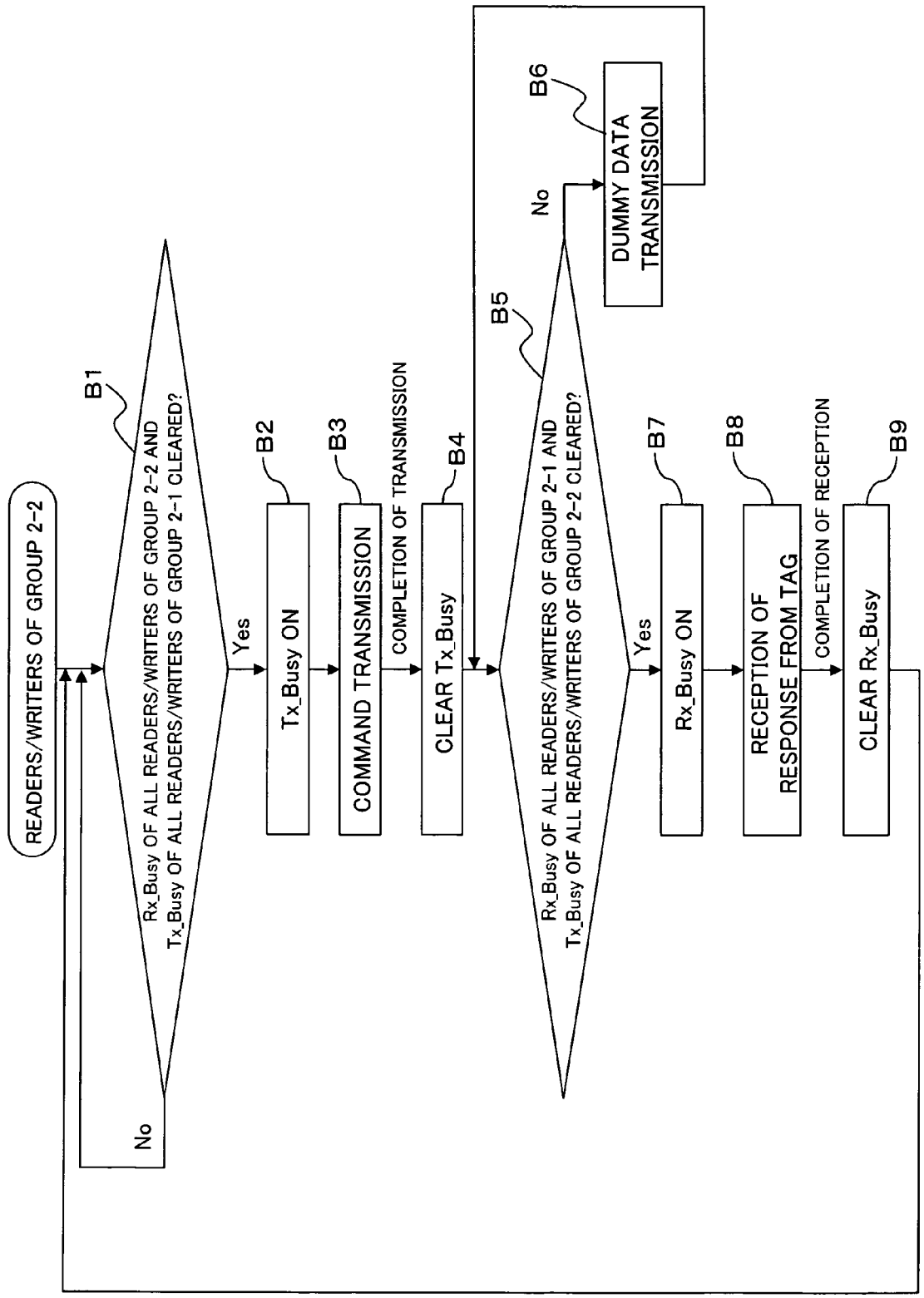
FIG. 8 is a flow chart for explaining an operation of the first embodiment of the present invention.

With the above-described configuration, in the radio interrogator system 1 according to the first embodiment of the present invention, the readers/writers 100-1 and 100-3 of the group 2-1 operate as shown in a flow chart of FIG. 7 while the readers/writers 100-2 and 100-4 of the group 2-2 operate as shown in a flow chart of FIG. 8.

Since the readers/writers 100-1 and 100-3 (100-2 and 100-4) pertaining to the same group 2-1 (2-2) operate almost similarly, the following description will be given taking node of one reader/writer 100-1 (100-2).

In the reader/writer 100-1 of the group 2-1 which operates in the reception mode, as shown in FIG. 7, on the basis of the transmission busy (Tx_Busy) states and reception busy (Rx- _Busy) states notified from this reader/writer 100-1 and the other readers/writers 100-2 to 100-4, the transmission/reception busy cancellation judgment unit 51*d*-1 (see FIG. 6) makes a judgment as to whether or not the reception busy states of all the readers/writers 100-1 and 100-3 pertaining to the group 2-1 come into cancellation and the transmission busy states of all the readers/writers 100-2 and 100-4 pertaining to the group 2-2 come into cancellation (step A1).

Following this, when the judgment in the transmission/reception busy cancellation judgment unit 51*d*-1 shows the cancellation of the aforesaid reception busy states and transmission busy states, the operation mode switching unit 51*d*-2 carries out the switching control on the operation mode from the reception mode to the transmission mode. Subsequently, through the monitor by the transmission/reception state monitoring unit 51*a*, the transmission/reception busy state notifying unit 51*b* outputs the transmission busy (Tx_Busy) to the other readers/writers 100-2 to 100-4 (from step A1 through YES route to step A2).

The operation mode still takes the reception mode until the cancellation of the aforesaid reception busy state and transmission busy state takes place (NO route from step A1).

When the transmission busy state is notified from the transmission/reception busy state notifying unit 51*b* as mentioned above, a modulation or the like is made with respect to transmitted data (including command information) from the non-shown data processing function unit in the processor 50, which enables a radio transmission signal to be sent to the radio tag 40-1 (step A3).

When the transmission of the transmission data to the radio tag 40-1 through use of the radio transmission signal comes to an end, the transmission/reception busy state notifying unit 51*b* of this reader/writer 100-1 cancels (clears) the transmission busy (Tx_Busy) (step A4).

In addition, on the basis of the transmission busy (Tx_Busy) states and reception busy (Rx_Busy) states outputted (notified) from this reader/writer 100-1 and the other readers/writers 100-2 to 100-4, the transmission/reception busy cancellation judgment unit 51*d*-1 of this reader/writer 100-1 makes a judgment as to whether or not the transmission busy states of all the readers/writers 100-1 and 100-3 pertaining to this group 2-1 are canceled and the reception busy states of all the readers/writers 100-2 and 100-4 pertaining to the other group 2-2 are canceled (step A5).

At this time, in the aforesaid step A4, dummy data is transmitted to the radio tag 40-1 under control of the dummy data transmission control unit 51*c* from when the transmission busy (Tx_Busy) is cleared in the reader/writer 100-1, in which it resides, until the reception busy states from the readers/writers 100-2 and 100-4 are cleared and the transmission state of the reader/writer 100-3 is cleared (from step A5 through NO route to step A6).

On the radio tag 40-1 side, the operation switching time for the start of transmission of a radio response signal subsequent to the reception of a radio transmission signal from the reader/writer 100-1 side can be synchronized with the operation switching time in the radio tags 40-2 to 40-4 which are objects of communications by the other readers/writers 100-2 to 100-4.

Thereafter, when the reception busy states from the readers/writers 100-2 and 100-4 are cleared and the transmission busy state of the reader/writer 100-3 is cleared, in the reader/writer 100-1, the operation mode switching unit 51*d*-2 switches the operation mode from the transmission mode to the reception mode and the transmission/reception busy state notifying unit 51*b* outputs the reception busy (Rx_Busy) state to the other reader/writers 100-2 to 100-4 (from step A5 through YES route to step A7).

This enables the reception of a radio response signal from the radio tag 40-1 as a response to the command information transmitted in the above-mentioned step A3 (step A8).

When the reception of the radio response signal from the radio tag 40-1 reaches completion, the transmission/reception busy state notifying unit 51*b* of this reader/writer 100-1 cancels (clears) the reception busy (Tx_Busy) (step A9), and the aforesaid switching setting unit 51*d* conducts a switching operation of the operation mode from the reception mode to the transmission mode (from step A9 to step A1).

Meanwhile, the operation of the reader/writer 100-2 of the group 2-2, which is operating in the reception mode, can basically be described corresponding to the above-mentioned operation of the reader/writer 100-1.

That is, as shown in FIG. 8, the transmission/reception busy cancellation judgment unit 51*d*-1 (see FIG. 6) makes a judgment as to whether or not the reception busy states of all the readers/writers 100-2 and 100-4 pertaining to the group 2-2 are canceled and the transmission busy states of all the readers/writers 100-1 and 100-3 pertaining to the group 2-1 are canceled (step B1).

In addition, in a case in which the judgment by this transmission/reception busy cancellation judgment unit 51*d*-1 shows the cancellation of the aforesaid reception busy state and transmission busy state, the operation mode switching unit 51*d*-2 carries out the operation mode switching control from the reception mode to the transmission mode. Following this, through the monitoring by the transmission/reception state monitoring unit 51*a*, the transmission/reception busy state notifying unit 51*b* outputs the transmission busy (Tx_Busy) to the other readers/writers 100-1, 100-3 and 100-4, so a radio transmission signal can be sent to the radio tag 40-2 (from step B1 through YES route to steps B2 and B3). When the transmission of a transmission command by the transmission signal comes to an end, the transmission/reception busy state notifying unit 51*b* cancels (clears) the transmission busy (step B4).

Still additionally, the transmission busy cancellation judgment unit 51*d*-1 of the reader/writer 100-2 makes a judgment as to whether or not the transmission busy states of all the readers/writers 100-2 and 100-4 pertaining to the group 2-2, in which it resides, are canceled and the reception busy states of all the readers/writers 100-1 and 100-3 pertaining to the other group 2-1 are canceled (step B5).

At this time, in the aforesaid step B4, dummy data is transmitted to the radio tag 40-2 under control of the dummy data transmission control unit 51*c* from when the transmission busy (Tx_Busy) is cleared in the reader/writer in which it resides until the reception busy states from the readers/writers 100-1 and 100-3 are cleared and the transmission busy state of the reader/writer 100-4 is cleared (from step B5 through NO route to step B6).

Thus, on the radio tag 40-2 side, the operation switching time for the start of transmission of a radio response signal subsequent to the reception of a radio transmission signal from the reader/writer 100-2 side can be synchronized with the operation switching time in the radio tags 40-1, 40-3 and 40-4 which are objects of communications by the other readers/writers 100-1, 100-3 and 100-4.

Thereafter, when the reception busy states from the readers/writers 100-1 and 100-3 are cleared and the transmission busy state of the reader/writer 100-4 is cleared, in the reader/writer 100-2, the operation mode switching unit 51*d*-2 switches the operation mode from the transmission mode to the reception mode, and the reception busy (Rx_Busy) state is outputted to the other reader/writers 100-1, 100-3 and 100-4 (from step B5 through YES route to steps B7 and B8).

When the reception of the radio response signal from the radio tag 40-2 reaches completion, the transmission/reception busy state notifying unit 51*b* of this reader/writer 100-2 cancels (clears) the reception busy (Tx_Busy) (step B9), and the aforesaid switching setting unit 51*d* conducts a switching operation of the operation mode from the reception mode to the transmission mode (from step B9 to step B1).

Meanwhile, the condition of the switching from the reception mode to the transmission mode in the reader/writer 100-2 (100-4) of the group 2-2 in the aforesaid step B1 is the same as the condition (step A5 in FIG. 7) of the switching from the transmission mode to the reception mode in the reader/writer 100-1 and 100-3 of the group 2-1. Moreover, the condition of the switching from the transmission mode to the reception mode in the reader/writer 100-2 (100-4) of the group 2-2 in the aforesaid step B5 is the same as the condition (step A5 in FIG. 7) of the switching from the reception mode to the transmission mode in the reader/writer 100-1 and 100-3 of the group 2-1.

This enables each of the readers/writers 100-1 to 100-4 to exclusively set a transmission mode for the transmission of a radio transmission signal to the radio tag 40-1 to 40-4 or a reception mode for the reception of a radio response signal transmitted from the radio tag 40-1 to 40-4 as a response to a radio transmission signal from the reader/writer 100-1 to 100-4 for each of the groups 2-1 and 2-2 to which it pertains.

Figure 9:
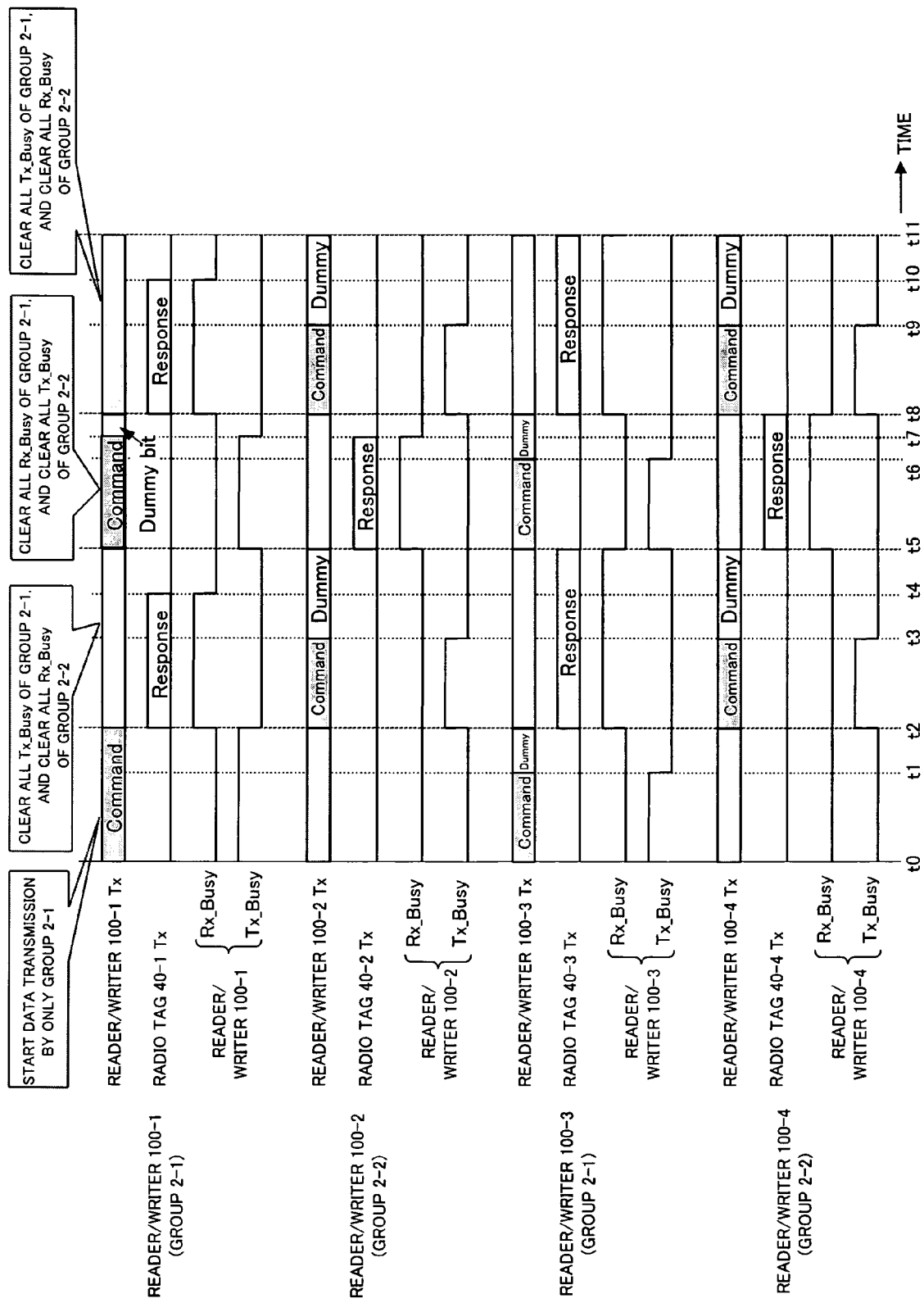
FIG. 9 is a time chart for explaining an operation of the first embodiment of the present invention.

That is, in the respective readers/writers 100-1 to 100-4, the switching between the transmission mode and the reception mode is made, for example, as shown in FIG. 9. In FIG. 9, at the start of the operation as the radio interrogator system 1, commands (Command) are transmitted from the readers/writers 100-1 and 100-3 of the group 2-1 to the radio tags 40-1 and 40-3 through the use of radio transmission signals (times t0 to t2).

At this time, since the radio response signals are not transmitted from the radio tags 40-2 and 40-4, the readers/writers 100-2 and 100-4 of the group 2-2 are not set to the reception modes, and the reception busy (Rx_Busy) to be notified by the transmission/reception busy state notifying unit 51*b* is canceled (low-level signal).

In this case, the transmission/reception busy state notifying unit 51*b* of each of the readers/writers 100-1 and 100-3 of the group 2-1 switches the transmission busy (Tx_Busy) from a busy state (high-level signal) to canceled state (low-level signal) after the transmission of a command comes to an end, while a dummy bit (Dummy) is transmitted until all the transmission busy states of the group 2-1 are canceled and the reception busy states of the group 2-2 are canceled. For example, although in the reader/writer 100-3 the command transmission comes to an end at time t1, the dummy bit is transmitted until the command transmission in the reader/writer 100-1 of the same group 2-1 reaches completion (see times t1 to t2).

Moreover, when all the transmission busy (Tx_Busy) states of the group 2-1 reach cancellation and all the reception busy (Rx_Busy) states of the group 2-2 reach cancellation, each of the readers/writers 100-1 and 100-3 enters a mode for the reception of a response from the corresponding 40-1, 40-3 and, at the same time, turns on the reception busy (Rx_Busy) state.

Simultaneously, each of the readers/writers 100-2 and 100-4 starts the transmission of a command (Command) to the corresponding radio tag 40-2, 40-4 through the use of a radio transmission signal and turns on the transmission busy (Tx_Busy) state.

This enables the reader/writer 100-1 to receive a radio response signal (Response) between the times t2 and t4 and the reader/writer 100-3 to receive a radio response signal between the times t2 and t5. Moreover, although in the reader/writer 100-2 the command transmission starting at the time t2 comes to an end at the time t3, dummy data is transmitted until the reception busy states in the readers/writers 100-1 and 100-3 are cleared and the transmission busy state in the reader/writer 100-4 is cleared (see times t3 to t5).

Accordingly, at the aforesaid times t0 to t2, the readers/writers 100-1 and 100-3 of the group 2-1 operate in the transmission mode while, between the times t2 and t5 subsequent thereto, the readers/writers 100-1 and 100-3 of the group 2-1 operate in the reception mode and the readers/writers 100-2 and 100-4 of the group 2-2 operate in the transmission mode.

Thereafter, likewise, between the times t5 and t8, the readers/writers 100-1 and 100-3 of the group 2-1 operate in the transmission mode and the readers/writers 100-2 and 100-4 of the group 2-2 operate in the reception mode while, between the times t8 and t11 subsequent thereto, the readers/writers 100-1 and 100-3 of the group 2-1 operate in the reception mode and the readers/writers 100-2 and 100-4 of the group 2-2 operate in the transmission mode.

In this way, the transmission/reception operations of all the readers/writers 100-1 to 100-4 are controlled through the use of the transmission busy signals (Tx_Busy) and reception busy signals (Rx_Busy) of the readers/writers 100-1 to 100-4, thereby eliminating the operation downtime of the respective readers/writers 100-1 to 100-4 and improving the throughput in comparison with the above-mentioned case shown in FIG. 14.

In addition, since the transmission/reception operation modes can exclusively set with respect to the readers/writers pertaining to different groups through the above-mentioned group classification, the radio transmission signals from the readers/writers 100-1 to 100-4 having the relationship in which the transmittable ranges of the radio transmission signals overlap with each other because the locations are brought close to each other are preventable from radio interference in the radio tags 40-1 to 40-4.

Still additionally, since the readers/writers 100-1 and 100-3 (100-2 and 100-4) pertaining to the same group through the above-mentioned group classification are disposed so as to relatively lengthen the minimum distance, the overlapping of the radio transmission signal transmittable ranges (receivable ranges of the radio tags) with each other is reducible, which can suppress the interference between the readers/writers of the same group to a minimum.

As described above, with the radio interrogator system 1 according to the first embodiment of the present invention, each of the readers/writers 100-1 to 100-4 has the operation mode setting unit 51 capable of exclusively setting a transmission mode for transmitting a radio transmission signal to the radio tag 40-1 to 40-4 or a reception mode for receiving a radio response signal transmitted from the radio tag 40-1 to 40-4 as a response to the radio transmission signal from this reader/writer 100-1 to 100-4 for each group, which can reduce the interference with the radio tags 40-1 to 40-4 and avoid the decrease in throughput in the entire radio interrogator system in a case in which a plurality of readers/writers 100-1 to 100-4 different from each other are disposed at positions relatively close to each other and operated at the same time.

Incidentally, although in the above detailed description of the first embodiment each of the readers/writers 100-1 to 100-4 makes a communication with a single radio tag 40-1 to

Figure 10:
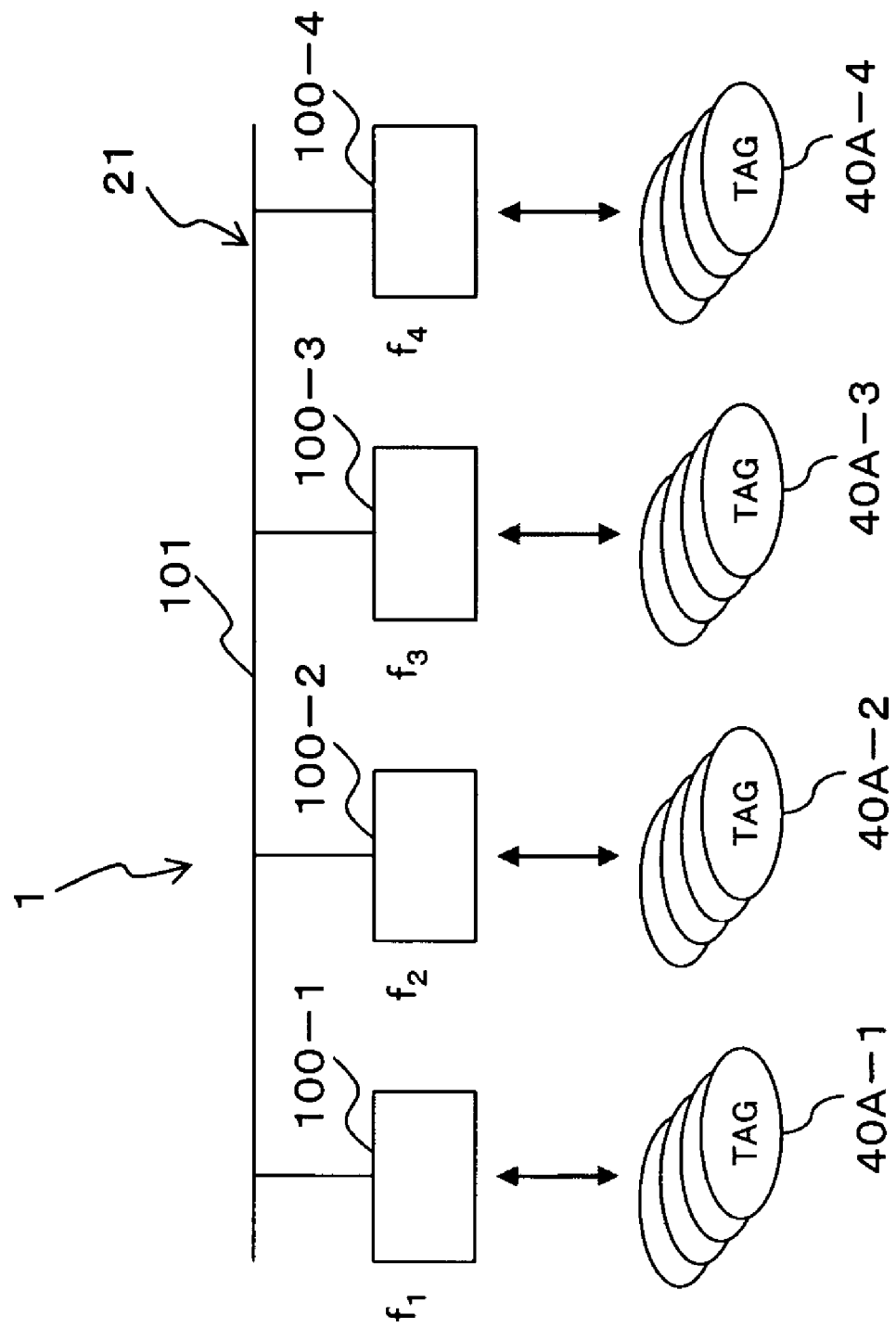
FIG. 10 is a block diagram showing a modification of the first embodiment of the present invention.

40-4, it is also appropriate that, for example, through the use of the well-known anti-collision control, for example, as shown in FIG. 10, each of the readers/writers 100-1 to 100-4 makes communications with a plurality of radio tag groups 40A-1 to 40A-4. As this anti-collision control, for example, there has been known Klaus Finkenzeller, RFID Handbook, UK, Wiley & Sons LTD., April 2003.

In addition, although in the above-described first embodiment the readers/writers 100-1 to 100-4 are connected through the wire line 101 to each other for the notification on busy states therebetween, according to the present invention, it is also appropriate that the respective readers/writers 100-1 to 100-4 are connected through a radio channel line for control, different from the channel used for the communications with the radio tags 40-1 to 40-4, i.e., a wireless line, for this busy state notification.

Still additionally, although in the above-described first embodiment the readers/writers 100-1 to 100-4 are group-classified into one of the transmission mode and the reception mode, the classification into a plurality of groups can also be made such that, for example, a group which conducts the transmission of a radio transmission signal from the reader/writer to the radio tag is taken as a first group, a group which performs the reception of a radio response signal transmitted from the radio tag as a response to a radio transmission signal from the reader/writer is taken as a second group and a group which does not carry out both the transmission to the radio tag and the reception of a radio response signal transmitted from the radio tag is taken as a third group.

In this case, for recognizing the operation mode of each group, as well as the notification of the transmission busy state or reception busy state from the operation mode setting unit 51 between the respective readers/writers, the state notification may be made through the use of a control signal.

This control signal for the state notification enables recognizing the transmission of a radio transmission signal to the radio tag, the reception of a radio response signal from the radio tag and the state in which both the transmission of a radio transmission signal and the reception of a radio response signal are not conducted, and allows these states to be switched in turn for each group.

[b] Description of Second Embodiment

Figure 11:
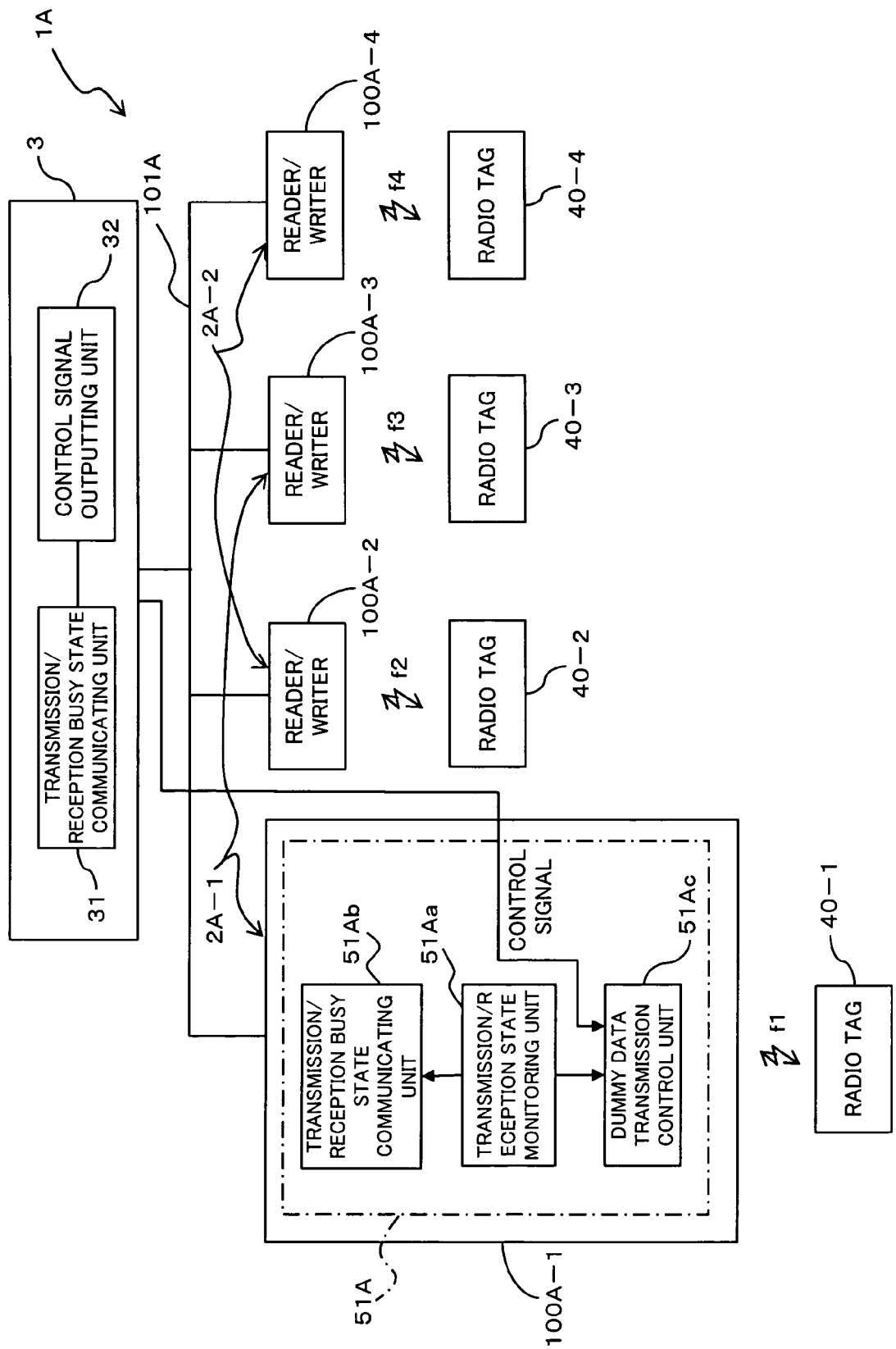
FIG. 11 is a block diagram showing a second embodiment of the present invention.

FIG. 11 is a block diagram showing a second embodiment of the present invention. In distinction from the above-described radio interrogator system 1 according to the first embodiment, a radio interrogator system 1A shown in FIG. 11 is equipped with a control unit 3 connected through a wire line 101A to readers/writers 100A-1 to 100A-4. On the other hand, as in the case of the above-described first embodiment, the respective readers/writers 100A-1 to 100A-4 are classified into a first group 2A-1 comprising the readers/writers 100A-1, 100A-3 and a second group 2A-2 comprising the readers/writers 100A-2, 100A-4.

This control unit 3 is designed to output a control signal to each of the readers/writers 100A-1 to 100A-4 for switching and setting the operation mode in each of the readers/writers 100A-1 to 100A-4 to one of a transmission mode and a reception mode, and corresponds to the switching setting unit 51*d* of the readers/writers 100-1 to 100-4 according to the above-described first embodiment. In addition, the control unit 3 includes a transmission/reception busy cancellation judgment unit 31 and a control signal outputting unit 32, which will be described later.

Each of the readers/writers 100A-1 to 100A-4 includes a control unit 51A serving as an operation mode setting unit to set a transmission mode or a reception mode on the basis of a control signal from this control unit 3 for each of the readers/writers 100A-1 to 100A-4 pertaining to the above-mentioned groups 2A-1 and 2A-2. In FIG. 11, an illustration is drawn taking note of the control unit 51A of the reader/writer 100A-1.

In this case, the control unit 51A corresponds to the above-mentioned control unit 51 shown in FIG. 5, and the configuration (see reference numerals 11 to 20 and 52 to 57) of each of the readers/writers 100A-1 to 100A-4 other than this control unit 51A is basically similar to that of each of the above-described readers/writers 100-1 to 100-4 according to the first embodiment. Moreover, in FIG. 11, the same reference numerals as those in FIGS. 1 to 6 designate almost same parts.

In addition, each of the control units 51A of the readers/writers 100A-1 to 100A-4 includes a transmission/reception state monitoring unit 51Aa, a transmission/reception busy state notifying unit 51Ab and a dummy data transmission control unit 51Ac, which correspond to those (see FIG. 6) in the above-described first embodiment. The following description will be given taking note of the configuration of the control unit 51A of the reader/writer 100A-1, and the control units 51A of the other readers/writers 100A-2 to 100A-4 naturally have a corresponding configuration.

The transmission/reception state monitoring unit (transmission state monitoring unit, reception state monitoring unit) 51Aa constituting the control unit 51A of the reader/writer 100A-1 is made to monitor a transmission state of a radio transmission signal to the radio tag 40-1 and further to monitor a reception state of a radio response signal from the radio tag 40-1 which stems from a radio transmission signal from this reader/writer 100A-1.

Furthermore, the transmission/reception busy state notifying unit (transmission busy state notifying unit, reception busy state notifying unit) 51Ab is made to notify a transmission busy state to the control unit 3 on the basis of a result of the monitoring by the transmission/reception state monitoring unit 51Aa during the transmission of a radio transmission signal to the radio tag 40-1 and cancels the aforesaid notification on the transmission busy state at the time that the transmission of the radio transmission signal to the radio tag 40-1 comes to an end. Moreover, on the basis of a result of the monitoring by the transmission/reception state monitoring unit 51Aa, it notifies the fact of a reception busy state to the control unit 3 during the reception of a radio response signal from the radio tag 40-1 which results from a radio transmission signal from this reader/writer 100A-1, and cancels the aforesaid notification on the reception busy state at the time that the reception of the radio response signal from the radio tag 40-1 comes to an end.

Still furthermore, on the basis of a result of the monitoring by the transmission/reception state monitoring unit 51Aa, when the transmission of a radio transmission signal to the radio tag 40-1 comes to an end, the dummy data transmission control unit 51Ac outputs a control signal to a frame assembling unit (see reference numeral 56 in FIG. 5) for transmitting dummy data to the radio tag 40-1 according to a control signal from the control unit 3 until busy signals of all the readers/writers 100A-2 to 100A-4 are canceled.

Yet furthermore, the aforesaid transmission/reception busy cancellation judgment unit 31 of the control unit 3 is for managing an operation mode of each of the readers/writers 100A-1 to 100A-4 on the basis of the notification from the transmission/reception busy state notifying unit 51Ab of each of the readers/writers 100A-1 to 100A-4, and it is for making a judgment as to whether or not the reception busy states of all the readers/writers (for example, readers/writers 100A-1 and 100A-3) pertaining to the group (for example, first group 2A-1) operating in the reception mode are canceled and the transmission busy states of all the readers/writers (for example, readers/writers 100A-2 and 100A-4) pertaining to the group 2A-2 operating in the transmission mode are canceled.

Moreover, when the judgment by the transmission/reception busy state judgment unit 31 shows the cancellation of the aforesaid reception busy states and transmission busy states in all the readers/writers 100A-1 to 100A-4, the control signal outputting unit 32 of the control unit 3 outputs a control signal for carrying out the switching control on the operation mode of each of the readers/writers 100A-1 to 100A-4 of the respective groups 2A-1 and 2A-2, from a reception mode to a transmission mode or from a transmission mode to a reception mode.

At this time, the control signal outputted from the control signal outputting unit 32 is outputted through the wireline 101A to the readers/writers 100A-1 to 100A-4. For example, the control unit 51A of each of the readers/writers 100A-1 and 100A-3 of the group 2A-1 operating in the reception mode receives, as the aforesaid control signal, a control signal Tx_ON for switching the operation mode from the reception mode to the transmission mode and outputs it to the frame assembling unit 56. Moreover, the control unit 51A of each of the readers/writers 100A-2 and 100A-4 of the group 2A-2 operating in the transmission mode receives, as the aforesaid control signal, a control signal Rx_ON for switching the operation mode from the transmission mode to the reception mode and outputs it to the demodulator 17.

In addition, on the basis of the above-mentioned control signal from the control unit 3, after the transmission of a radio transmission signal to each of the radio tags 40-1 to 40-4 reaches completion, the dummy data transmission control unit 51Ac constituting the control unit 51A of each of the readers/writers 100A-1 to 100A-4 transmits dummy data until the transmission busy states of all the readers/writers 100A-1 and 100A-3 (100A-2 and 100A-4) pertaining to the group 2A-1 (or 2A-2) are canceled and the reception busy states of all the readers/writers 100A-2 and 100A-4 (100A-1 and 100A-3) pertaining to the other group 2A-2 (2A-1) are canceled.

With the above-described configuration, in the radio interrogator system 1A according to the second embodiment of the present invention, on the basis of the transmission busy (Tx_Busy) or reception busy (Rx_Busy) notified from the readers/writers 100A-1 to 100A-4 pertaining to the respective groups 2A-1 and 2A-2, the control unit 3 manages the operation mode thereof and, in response to the cancellation of the transmission busy or reception busy in all the readers/writers 100A-1 to 100A-4, outputs control signals for switching the operation modes of the readers/writers 100A-1 to 100A-4 from the transmission modes to the reception modes or from the reception modes to the transmission modes.

Thus, as well as the case of the above-described first embodiment, in each of the readers/writers 100A-1 to 100A-4, the operation mode can be switched according to a control signal from the control unit 3. At this time, the readers/writers 100A-1 to 100A-4 pertaining to the groups different from each other can set the operation modes so that, when one group is in the transmission mode, the other group takes the reception mode while, when the one group is in the reception mode, the other group takes the transmission mode, thereby improving the throughput in comparison with the above-described case shown in FIG. 14.

In addition, since the transmission/reception operation modes can be exclusively set with respect to the readers/writers pertaining to the different groups by the above-mentioned group classification, the radio transmission signals from the readers/writers 100A-1 to 100A-4 having the relationship in which the transmittable ranges of the radio transmission signals overlap with each other because the locations are brought close to each other are preventable from radio interference in the radio tags 40-1 to 40-4.

Still additionally, since the readers/writers 100A-1 and 100A-3 (100A-2 and 100A-4) pertaining to the same group through the above-mentioned group classification are disposed so as to relatively lengthen the minimum distance, the overlapping of the radio transmission signal transmittable ranges (receivable ranges of the radio tags) with each other is reducible, which can suppress the interference between the readers/writers of the same group to a minimum.

As described above, in the radio interrogator system 1A according to the second embodiment of the present invention, since the control unit 3 is provided and the control units 51A are provided as the operation mode setting units in the readers/writers 100A-1 to 100A-4, as well as the above-described first embodiment, it is possible to reduce the interference with the radio tags 40-1 to 40-4 and avoid the decrease in throughput in the entire radio interrogator system in a case in which a plurality of readers/writers 100-1 to 100-4 different from each other are disposed at positions relatively close to each other and operated at the same time.

Figure 12:
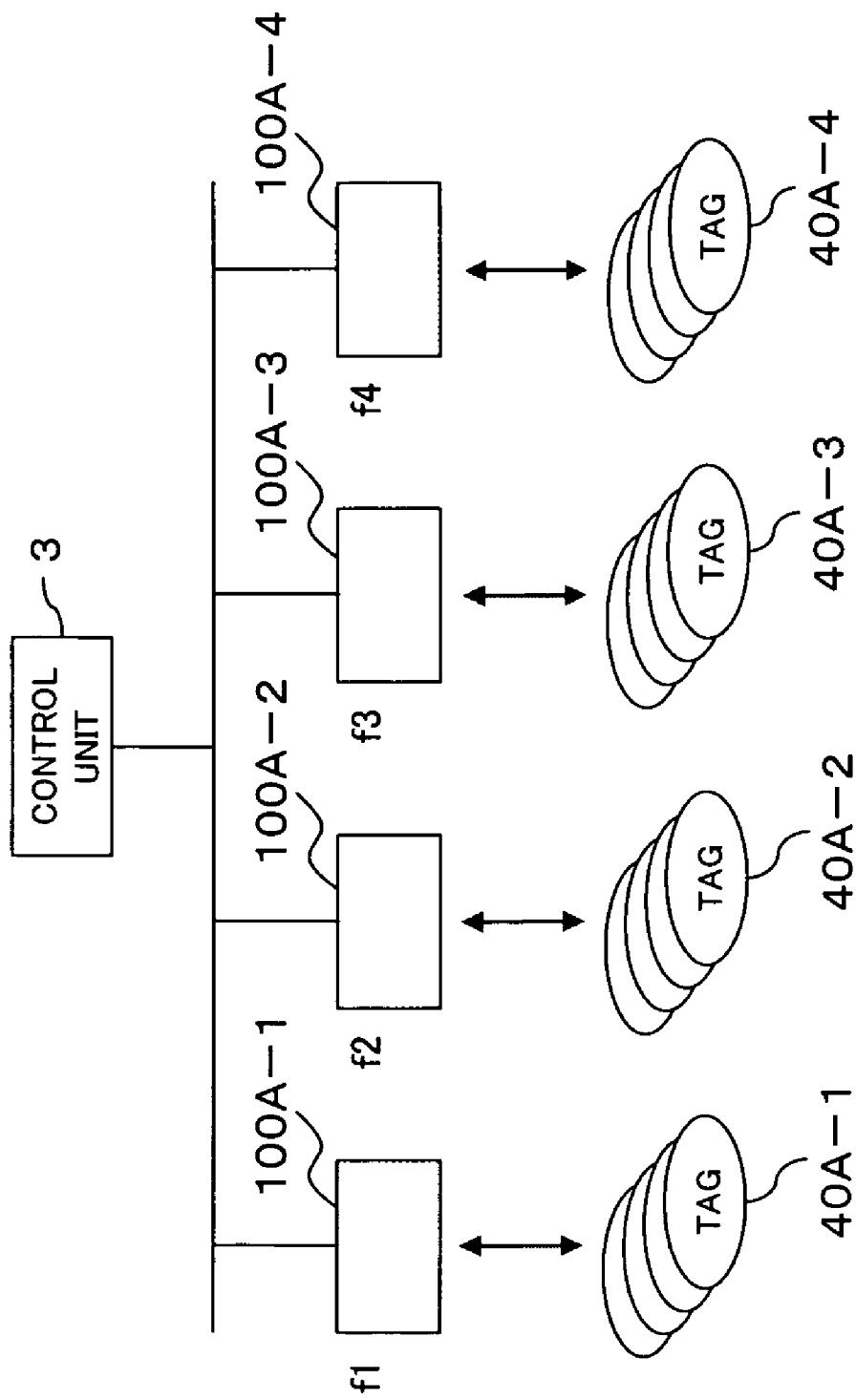
Figure 13:
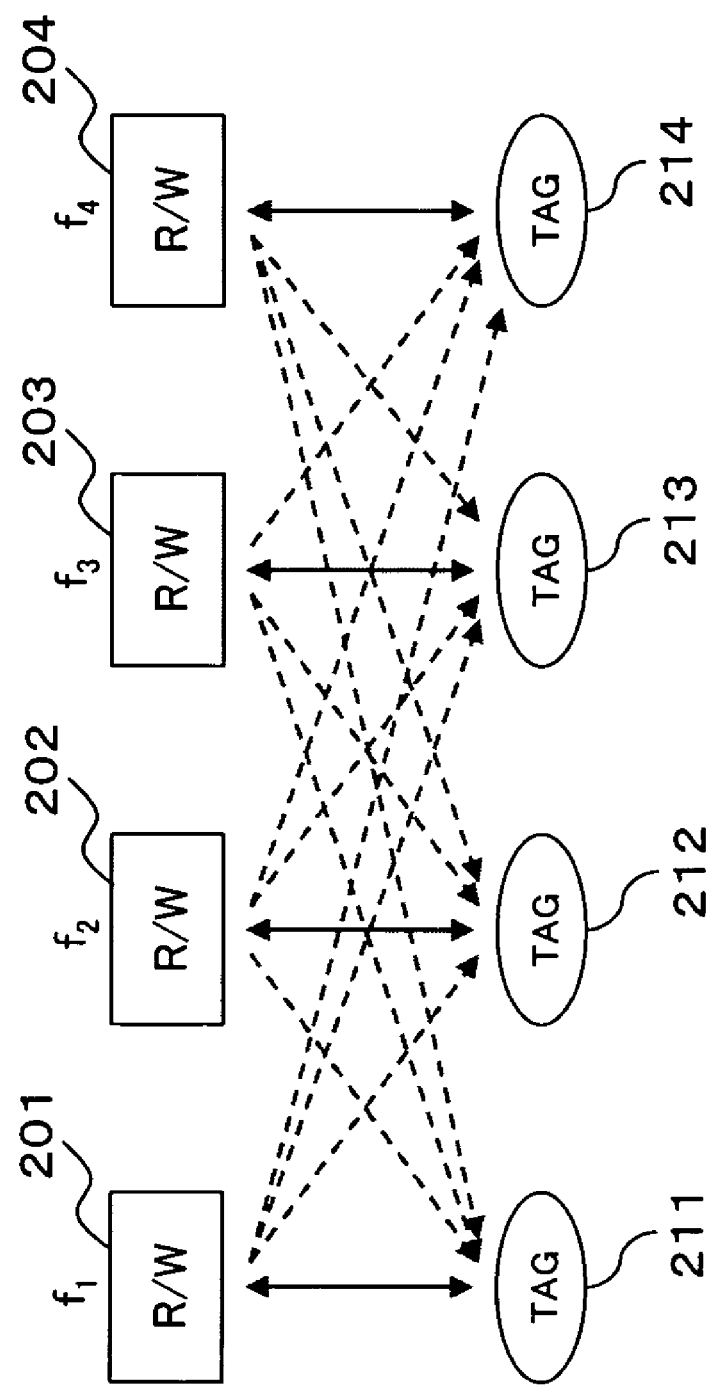
FIG. 13 is an illustration for explaining a conventional technique.

In addition, although in the above detailed description of the second embodiment each of the readers/writers 100A-1 to 100A-4 makes a communication with a single radio tag 40-1 to 40-4, it is also appropriate that, for example, through the use of the well-known anti-collision control, for example, as shown in FIG. 12, each of the readers/writers 100A-1 to 100A-4 makes communications with a plurality of radio tag groups 40A-1 to 40A-4.

Still additionally, although in the above-described second embodiment the busy state notification is made from the readers/writers 100A-1 to 100A-4 to the control unit 3, and the control unit 3 and the readers/writers 100A-1 to 100A-4 are connected through the wire line 101A to each other for outputting a control signal from the control unit 3 to the readers/writers 100A-1 to 100A-4, according to the present invention, it is also appropriate that the control unit 3 and the readers/writers 100A-1 to 100A-4 are connected through a radio channel line for control, different from the channel used for the communications with the radio tags 40-1 to 40-4, i.e., a wireless line.

Yet additionally, although in the above-described second embodiment the readers/writers 100A-1 to 100A-4 are classified into the first group and the second group and switching-set to one of the transmission mode and the reception mode, for example, a mode which carries out neither the transmission to the radio tag nor the reception of a radio response signal transmitted from the radio tag is set as a third group so that the control can be executed according to a control signal from the control unit. In this case, the switching among the respective modes can be made in turn for each group.

[c] Others

The present invention is not limited to the above-described embodiments, and it is intended to cover all changes of the embodiments of the invention herein which do not constitute departures from the spirit and scope of the invention.

For example, although in each of the above-described embodiments the radio interrogator system 1 is made up of four readers/writers each serving as a radio interrogator, according to the present invention, it is also appropriate that a radio interrogator system is made up of a plurality of readers/writers different in number therefrom.

Through the above-described embodiments of the present invention, a person skilled in the art can manufacture the apparatus according to the present invention.

INDUSTRIAL APPLICABILITY

As described above, the radio interrogator systems according to the present invention are useful for reducing the interference with radio transponders and avoid the decrease in throughput in the entire radio interrogator system in a case in which a plurality of radio interrogators different from each other are disposed at positions relatively close to each other and operated at the same time and, in particular, is suitable for the management of manufactured goods and products in manufacturing industries and commercial distribution fields.

What is claimed is:

1. A radio interrogator system, which includes a plurality of radio interrogators each made to transmit a radio transmission signal to a radio transponder and receive a radio response signal from the radio transponder, wherein
the plurality of radio interrogators are classified into two groups and each of the radio interrogators has an operation mode setting unit to set a transmission mode for transmitting the radio transmission signal to the radio transponder or a reception mode for receiving the radio response signal transmitted from the radio transponder as a response to the radio transmission signal from the radio interrogator for each of the classified groups,
the operation mode setting unit of each of the radio interrogators has a switching setting unit to switch and set the operation mode of the radio interrogator, in which the operation mode setting unit resides, to one of the transmission mode and the reception mode on the basis of a transmission state of the radio transmission signal and a reception state of the radio response signal in the other radio interrogators and the radio interrogator in which the operation mode setting unit resides, and
the operation mode setting unit of each of the radio interrogators includes a transmission state monitoring unit for monitoring a transmission state of a radio transmission signal to the radio transponder and a transmission busy state notifying unit for, on the basis of a result of the monitoring by the transmission state monitoring unit, making a notification to the effect of a transmission busy state to the switching setting units of the other radio interrogators during the transmission of the radio transmission signal and canceling the notification on the transmission busy state at the time that the transmission of the radio transmission signal comes to an end.

2. The radio interrogator system according to claim 1, wherein the operation mode setting unit of each of the radio interrogators sets the reception mode without transmitting the radio transmission signal to the radio transponder while the radio interrogators of the other group are in the transmission mode.

3. The radio interrogator system according to claim 2, wherein the operation mode setting unit of each of the radio interrogators set the transmission mode without receiving the radio response signal from the radio transponder while the radio interrogators of the other group are in the reception mode.

4. The radio interrogator system according to claim 1, wherein the operation mode setting unit of each of the radio interrogators includes a reception state monitoring unit for monitoring a reception state of a radio response signal from the radio transponder stemming from the radio transmission signal from the radio interrogator and a reception busy state notifying unit for, on the basis of a result of the monitoring by the reception state monitoring unit, making a notification to the effect of a reception busy state to the switching setting units of the other radio interrogators during the reception of the radio transmission signal and canceling the notification on the reception busy state at the time that the reception of the radio response signal comes to an end.

5. The radio interrogator system according to claim 4, wherein the switching setting unit of each of the radio interrogators includes a first transmission/reception busy cancellation judgment unit for, on the basis of notifications from the transmission busy state notifying units and the reception busy state notifying units in the radio interrogator, in which the switching setting unit resides, and in the other radio interrogators, canceling the reception busy states of all the radio interrogators pertaining to the group, to which the radio interrogator pertains, and making a judgment as to whether or not the transmission busy states of all the radio interrogators pertaining to the other group are canceled, and a first operation mode switching unit for, when the first transmission/reception busy cancellation judgment unit judges that the reception busy states and the transmission busy states are canceled, carrying out control to switch the operation mode from the reception mode to the transmission mode.

6. The radio interrogator system according to claim 4, wherein the radio interrogators are connected through a line to each other so as to notify, to the other radio interrogators, the reception busy state to be notified by the reception busy state notifying unit and the transmission busy state to be notified by the transmission busy state notifying unit.

7. The radio interrogator system according to claim 1, wherein the plurality of radio interrogators are classified into two groups so that a minimum distance between the individual radio interrogators pertaining to the same group becomes relatively long.

8. The radio interrogator system according to claim 1, wherein the plurality of radio interrogators are classified into two groups according to frequency channel.

9. A radio communication method for a radio interrogator system including a plurality of radio interrogators each made to interchange a radio signal with respect to a radio transponder, wherein
the plurality of radio interrogators are classified into two groups according to two types of communication channels and the radio interrogator pertaining to one group is set in a reception mode for receiving, from a first radio transponder in communication with the radio interrogator pertaining to the one group, a radio response signal stemming from a radio transmission signal from the radio interrogator pertaining to the one group without transmitting a radio transmission signal to the first radio transponder while the radio interrogators pertaining to the other group are in a transmission mode for transmitting a radio transmission signal to a second radio transponder in communication with the radio interrogator pertaining to the other group, and the radio interrogator pertaining to the one group is set in a transmission mode for transmitting a radio transmission signal to the first radio transponder without receiving a radio response signal from the first radio transponder while the radio interrogators pertaining to the other group is in a reception mode for receiving, from the second radio transponder, a radio response signal stemming from a radio transmission signal from the radio interrogator pertaining to the other group,
the setting of the operation mode in each radio interrogator is performed on the basis of a transmission state of the radio transmission signal and a reception state of the radio response signal in the other radio interrogators and the radio interrogator, for setting the operation mode, the radio interrogator in the transmission mode monitors a transmission state of the radio transmission signal to the corresponding first radio transponder, outputs a transmission busy state to the other radio interrogators during the transmission of the radio transmission signal on the basis of the monitoring, and cancels the output of the transmission busy state at the time that the transmission of the radio transmission signal comes to an end, while the radio interrogator in the reception mode monitors a reception state of the radio response signal and outputs a reception busy state to the other radio interrogators during the reception of the radio response signal and cancels the output of the reception busy state at the time that the reception of the radio response signal comes to an end, and for setting the operation mode, each of the radio interrogators in the reception mode makes a judgment, on the basis of the transmission busy states and reception busy states outputted from this radio interrogator and the other radio interrogators, as to whether or not the reception busy states of all the radio interrogators pertaining to the group including this radio interrogator are canceled and the transmission busy states of all the radio interrogators pertaining to the other group are canceled and, when the judgment shows the cancellation of the reception busy states and the transmission busy states, carries out control for switching the operation mode from the reception mode to the transmission mode, while each of the radio interrogators in the transmission mode makes a judgment, on the basis of the transmission busy states and reception busy states outputted from this radio interrogator and the other radio interrogators, as to whether or not the transmission busy states of all the radio interrogators pertaining to the group including this radio interrogator are canceled and the reception busy states of all the radio interrogators pertaining to the other group are canceled and, when the judgment shows the cancellation of the transmission busy states and the reception busy states, carries out control for switching the operation mode from the transmission mode to the reception mode.

10. The radio communication method for a radio interrogator system according to claim 9, wherein the plurality of radio interrogators are classified into the two groups so that a minimum distance between the individual radio interrogators pertaining to the same group becomes relatively long.

11. The radio communication method for a radio interrogator system according to claim 9, wherein the plurality of radio interrogators are classified into the two groups according to a frequency channel set in each of the radio interrogators for interchanging a radio signal with respect to the radio transponder.

12. The radio communication method for a radio interrogator system according to claim 9, wherein each of the radio interrogators transmits dummy data from when the transmission of the radio transmission signal to the radio transponder comes to an end until the transmission busy states of all the radio interrogators pertaining to the group including this radio interrogator are canceled and the reception busy states of all the radio interrogators pertaining to the other group are canceled.

13. A radio interrogator system, which includes a plurality of radio interrogators each made to transmit a radio transmission signal to a radio transponder and receive a radio response signal from the radio transponder, wherein the plurality of radio interrogators are classified into two groups and each of the radio interrogators has an operation mode setting unit to set a transmission mode for transmitting the radio transmission signal to the radio transponder or a reception mode for receiving the radio response signal transmitted from the radio transponder as a response to the radio transmission signal from the radio interrogator for each of the classified groups, the operation mode setting unit of each of the radio interrogators has a switching setting unit to switch and set the operation mode of the radio interrogator, in which the operation mode setting unit resides, to one of the transmission mode and the reception mode on the basis of a transmission state of the radio transmission signal and a reception state of the radio response signal in the other radio interrogators and the radio interrogator in which the operation mode setting unit resides, and the radio interrogator system further comprising a control unit for outputting a control signal to switch and set the operation mode in each of the radio interrogators to one of the transmission mode the reception mode, wherein the operation mode setting unit of each of the radio interrogators being made to set the transmission mode or the reception mode on the basis of the control signal from the control unit, and the operation mode setting unit of each of the radio interrogators includes a transmission state monitoring unit for monitoring a transmission state of a radio transmission signal to the radio transponder and a transmission busy state notifying unit for, on the basis of a result of the monitoring by the transmission state monitoring unit, making a notification to the effect of a transmission busy state to the control unit during the transmission of the radio transmission signal and canceling the notification on the transmission busy state at the time that the transmission of the radio transmission signal comes to an end.

14. The radio interrogator system according to claim 13, wherein the operation mode setting unit of each of the radio interrogators comprises a reception state monitoring unit for monitoring a reception state of a radio response signal from the radio transponder stemming from the radio transmission signal from the radio interrogator and a reception busy state notifying unit for, on the basis of a result of the monitoring by the reception state monitoring unit, making a notification on a reception busy state to the control unit during the reception of the radio response signal, and for canceling the notification on the reception busy state at the time that the reception of the radio response signal comes to an end.

15. The radio interrogator system according to claim 14, wherein the control unit and each of the radio interrogators are connected through a line to each other so that the reception busy state notifying unit notifies the reception busy state to the control unit and the transmission busy state notifying unit notifies the transmission busy state to the control unit and the control unit outputs the control signal to each of the radio interrogators.

* * * * *